US010663955B2

(12) United States Patent
Kuikka

(10) Patent No.: US 10,663,955 B2
(45) Date of Patent: May 26, 2020

(54) WORK MACHINE CONTROL

(71) Applicant: Tana Oy, Jyväskylä (FI)

(72) Inventor: Petri Kuikka, Lievestuore (FI)

(73) Assignee: Tana Oy, Jyväskylä (FI)

( * ) Notice: Subject to any disclaimer, the term of this patent is extended or adjusted under 35 U.S.C. 154(b) by 430 days.

(21) Appl. No.: 14/888,672

(22) PCT Filed: Apr. 30, 2014

(86) PCT No.: PCT/FI2014/050318
§ 371 (c)(1),
(2) Date: Nov. 2, 2015

(87) PCT Pub. No.: WO2014/177769
PCT Pub. Date: Nov. 6, 2014

(65) Prior Publication Data
US 2016/0224021 A1 Aug. 4, 2016

(30) Foreign Application Priority Data

Apr. 30, 2013 (WO) .................. PCT/FI2013/050482

(51) Int. Cl.
*G05B 19/418* (2006.01)
*E02F 9/20* (2006.01)
(Continued)

(52) U.S. Cl.
CPC ...... *G05B 19/41815* (2013.01); *B02C 21/026* (2013.01); *B02C 25/00* (2013.01);
(Continued)

(58) Field of Classification Search
CPC ..... G05B 19/41815; G05B 2219/31124; E02F 9/26; E02F 9/2054; B02C 21/026; B02C 25/00
See application file for complete search history.

(56) References Cited

U.S. PATENT DOCUMENTS 5,646,844 A * 7/1997 Gudat .................. E01C 19/004
701/409
5,935,192 A 8/1999 Henderson et al.
(Continued)

FOREIGN PATENT DOCUMENTS

EP 1414002 A1 4/2004
EP 1441077 A1 7/2004
(Continued)

OTHER PUBLICATIONS

Written Opinion of International Searching Authority for PCT/FI2013/050482, dated Jan. 13, 2014 (7 pages).
(Continued)

*Primary Examiner* — Bitew A Dinke
(74) *Attorney, Agent, or Firm* — Ziegler IP Law Group LLC

(57) ABSTRACT

The invention relates to controlling and/or managing recycling and/or waste management work machines.

According to an embodiment a method for managing work machines comprises receiving a first message at a receiving work machine from a sending work machine. Said first message comprising message fields, wherein at least one message field comprises information on machines already joined in the job. The method comprises forming at least one modified message field to include information of the receiving machine and its placement in relation to other machines already joined in the job. The method comprises transmitting said at least one modified message field from said receiving work machine to said sending work machine.

16 Claims, 8 Drawing Sheets

(51) Int. Cl.
  *B02C 21/02*  (2006.01)
  *B02C 25/00*  (2006.01)
  *E02F 9/26*  (2006.01)

(52) U.S. Cl.
  CPC .............. *E02F 9/2054* (2013.01); *E02F 9/26* (2013.01); *G05B 2219/31124* (2013.01)

(56) References Cited

U.S. PATENT DOCUMENTS

| | | | |
|---|---|---|---|
| 6,041,306 A | 3/2000 | Du et al. | |
| 6,226,572 B1 | 5/2001 | Tojima et al. | |
| 6,466,584 B1* | 10/2002 | Maxwell | H04B 3/54 370/458 |
| 7,058,087 B1* | 6/2006 | Oz | H04J 3/1682 370/468 |
| 2003/0055890 A1* | 3/2003 | Senda | H04N 1/00206 709/203 |
| 2003/0225707 A1* | 12/2003 | Ehrman | G06Q 10/08 705/64 |
| 2005/0002354 A1* | 1/2005 | Kelly | H04L 45/04 370/329 |
| 2005/0096770 A1 | 5/2005 | Chua et al. | |
| 2005/0201371 A1* | 9/2005 | Lauer | H04W 24/00 370/389 |
| 2006/0047377 A1* | 3/2006 | Ferguson | E02F 9/205 701/2 |
| 2007/0129869 A1* | 6/2007 | Gudat | G05D 1/0297 701/50 |
| 2007/0230496 A1* | 10/2007 | Guo | H04L 1/007 370/432 |
| 2007/0232310 A1* | 10/2007 | Schiff | H04W 4/12 455/436 |
| 2008/0256251 A1* | 10/2008 | Huotari | H04L 67/16 709/229 |
| 2009/0062993 A1 | 3/2009 | Morey et al. | |
| 2009/0099897 A1* | 4/2009 | Ehrman | G06Q 10/06 705/7.15 |
| 2009/0216410 A1* | 8/2009 | Allen | G05D 1/0238 701/50 |
| 2011/0131461 A1* | 6/2011 | Schulz | H04L 1/1819 714/749 |
| 2012/0215378 A1* | 8/2012 | Sprock | E02F 9/205 701/2 |
| 2012/0220214 A1* | 8/2012 | Du | H04B 7/15542 455/7 |
| 2013/0084860 A1* | 4/2013 | Wong | H04W 60/00 455/435.1 |
| 2014/0146167 A1* | 5/2014 | Friend | G01S 17/023 348/118 |

FOREIGN PATENT DOCUMENTS

| | | |
|---|---|---|
| EP | 1643040 A2 | 4/2006 |
| EP | 2132972 A1 | 12/2009 |
| JP | 2002105989 A | 4/2002 |
| WO | 2008129115 A1 | 10/2008 |
| WO | 2008140360 A1 | 11/2008 |
| WO | 2009011630 A1 | 1/2009 |

OTHER PUBLICATIONS

Written Opinion of International Search Authority for PCT/FI2014/050318, dated Sep. 2, 2014 (11 pages).
Extended European Search Report, Application No. 14791662.1-1712/2992487 PCT/FI2014/050318, dated Mar. 23, 2017, 15 pages.
Partial Supplementary European Search Report, Application No. 14791662.1-1712/2992487 PCT/FI2014050318, dated Nov. 21, 2016, 7 pages.

* cited by examiner

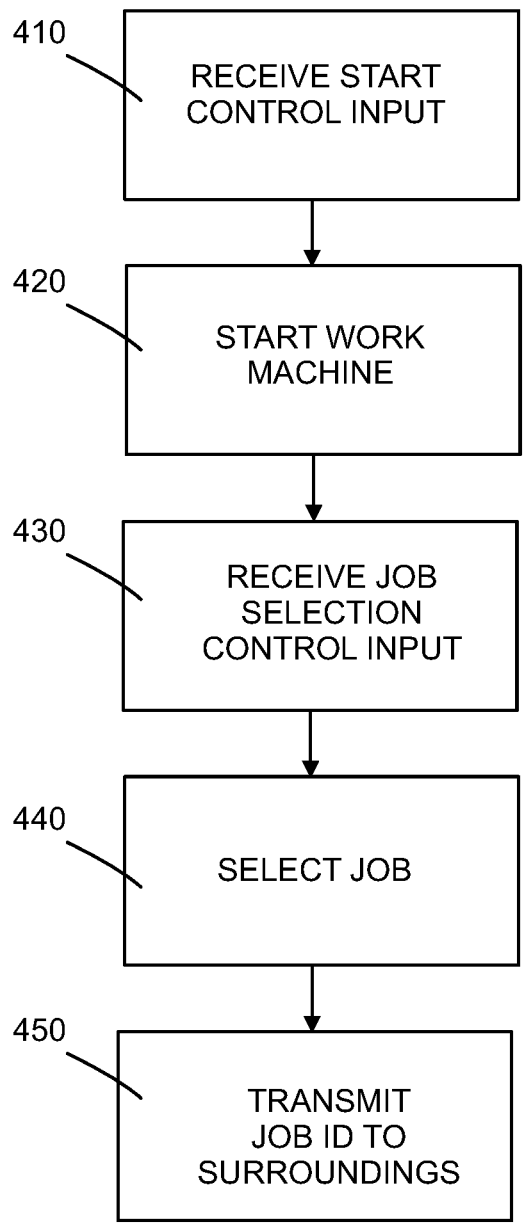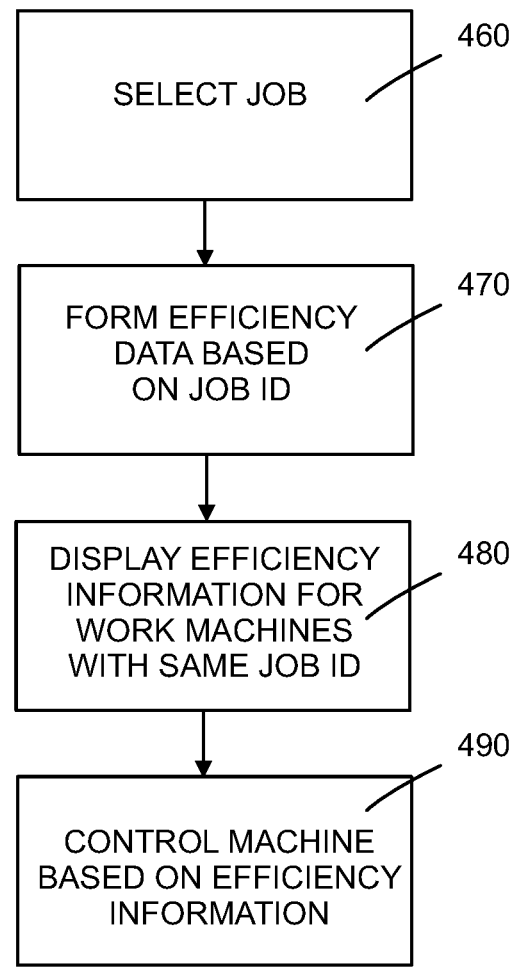
Fig. 4A
Fig. 4B

WORK MACHINE CONTROL

FIELD OF THE INVENTION

The present invention relates to controlling work machines, for example to controlling the interworking of recycling work machines.

BACKGROUND OF THE INVENTION

As prices of raw materials and energy continue to rise, efficiency and productivity in recycling and waste management systems becomes all the more necessary. Often, the personnel operating such systems may have limited educational background, and managing complex systems and operating them in an efficient manner may thus be very difficult. Adding to this difficulty, the mobile work machines may be grouped together in various different ways, e.g. depending on what kind of material is being processed and how the work has been organized. The machines may be arranged into a process pipeline, where the output of one work machine is the input of another work machine, and the different machines need to be controlled as a group. Even if the machines are not arranged to be controlled together, their efficiency may need to be evaluated to be able to arrange the work more efficiently.

For these and other reasons, there is a need for easier and/or more efficient ways of managing and controlling recycling and waste management systems comprising work machines.

SUMMARY OF THE INVENTION

The embodiments aim to control a work process and/or work process entities. Controlling may be implemented via messages or a messaging system according to embodiments. The messages and/or the messaging system which may enable controlling work process entities with reduced user interaction.

According to an embodiment a method for managing work machines comprises receiving a first message at a receiving work machine from a sending work machine. Said first message comprising message fields, wherein at least one message field comprises information on machines already joined in a job. The method comprises forming at least one modified message field to include information of the receiving machine and its placement in relation to other machines already joined in the job. The method comprises transmitting said at least one modified message field from said receiving work machine to said sending work machine.

According to an embodiment a method for managing work machines comprises transmitting a message to a receiving work machine from a sending work machine, said message comprising message fields, wherein at least one message field comprising information on machines already joined in a job. The method comprises receiving a message comprising at least one modified message field from said receiving work machine to said sending work machine, wherein said modified message field includes information of the receiving machine and its placement in relation to other machines already joined in the job.

According to an embodiment a module for a work machine comprises a processor and computer program code, wherein said computer program code, when executed on said processor, is configured to cause the work machine to receive a first message from a sending work machine. Said first message comprises message fields and said message fields comprise information on machines already joined in the job. The module is configured to cause the work machine to form at least one modified message field to include information of the work machine and its placement in relation to other machines already joined in the job, and to transmit said at least one modified message field to said sending work machine.

An embodiment comprises a module for managing work machines comprising a processor and computer program code, wherein said computer program code, when executed on said processor, is configured to cause the module to form a message comprising message fields, said message fields comprising information on machines already joined in a job, transmit a message via wireless connection, and receive a message comprising at least one modified message field, said modified message field including information of the job, machine(s) currently participating the job and the machine(s) placement in relation to each other in the job.

In an embodiment a computer program product comprises computer executable code, wherein said computer executable code is being arranged to, when executed on a processor, to cause a system to receive a first message, said first message comprising message fields, wherein at least one message field comprises information on entities already joined in the job, form at least one modified message field to include information of the receiving entity and its placement in relation to other entities already joined in the job, and transmit said at least one modified message field from said receiving entity to said sending entity.

An embodiment comprises a data structure for controlling an operation of a work machines. Said data structure comprises a field comprising a job-id, wherein the field comprising the job-id comprises information on a job, work machines joined to the job and arrangement of the work machines joined to the job in relation to each other. The message further comprises a sender-id field for identifying a machine arranged to send the message and a receiver-id field for identifying a machine arranged to receive the message.

An embodiment comprises a computer program product comprising computer executable code, said computer executable code being arranged to, when executed on a processor, to cause a system or a machine to receive a first message at a receiving work machine from a sending work machine, said first message comprising message fields, wherein at least one message field comprises information on machines already joined in the job. The computer executable code is arranged to cause a system or a machine to form at least one modified message field to include information of the receiving machine and its placement in relation to other machines already joined in the job. The system or the machine is further caused to transmit said at least one modified message field from said receiving work machine to said sending work machine.

In an embodiment a computer program product comprises computer executable code, said computer executable code being arranged to, when executed on a processor, to cause a system or a machine to transmit a message to a receiving work machine from a sending work machine, said message comprising message fields, said message fields comprising information on machines already joined in the job. The machine or the system is further caused to receive a message comprising at least one modified message field from said receiving work machine to said sending work machine, said modified message field including information of the receiving machine and its placement in relation to other machines already joined in the job.

According to an embodiment a work machine comprises means for receiving a first message at a receiving work machine from a sending work machine, said first message comprising message fields, wherein at last one message field comprises information on machines already joined in the job. The work machine comprises means for forming at least one modified message field to include information of the receiving machine and its placement in relation to other machines already joined in the job. The work machine further comprises means for transmitting said at least one modified message field from said receiving work machine to said sending work machine.

According to an embodiment a work machine comprises means for transmitting a message to a receiving work machine from a sending work machine, said message comprising message fields, wherein at least one message field comprising information on machines already joined in the job. The work machine may further comprise means for receiving a message comprising at least one modified message field from said receiving work machine to said sending work machine, said modified message field including information of the receiving machine and its placement in relation to other machines already joined in the job.

According to at least one/all embodiments a messaging system for controlling a work process, comprises messages comprising message fields, wherein at least one message field comprises information on the work process and the user currently joined in the work process.

DESCRIPTION OF THE DRAWINGS

In the following, various example embodiments will be described with reference to the Figures, in which

FIG. 4a shows a flow chart of a method for initiating inter-working of work machines according to an example embodiment;

FIG. 4b shows a flow chart of a method for controlling work machines according to an example embodiment;

DETAILED DESCRIPTION OF THE INVENTION

In the following, the operation of the various embodiments will be described with reference to recycling or waste processing work machines. However, the invention has applications in any environment where inter-working of work machines needs to be improved. The specific examples of job id and work processes given herein are to be taken as examples only, and it needs to be understood that the job id may be any identifier in the work machine system that allows the determination of what work is being carried out at a specific work machine.

Figure 1A:
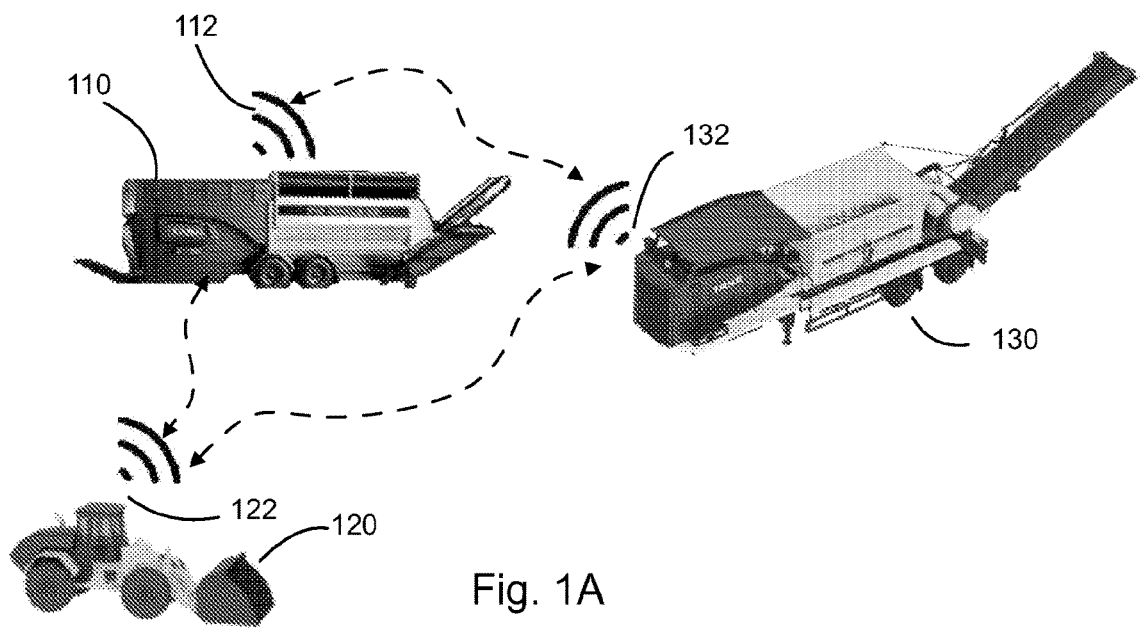
FIG. 1a depicts a commonly used recycling work machine setup with a number of work machines.

FIG. 1a depicts a commonly used recycling work machine setup with a number of work machines. A first work machine 130, for example a shredder machine, is started ready to receive material to be processed. The material to be processed is input to the machine by a wheel loader 120. From the shredder, the shredded material is output to a screening machine 110 so that the material sizes can be further separated. The different machines 110, 120, 130 are thus in an inter-working arrangement with respect to each other; the operation of one machine affects the operation of another machine and the total efficiency of the machine arrangement. The machines are connected to each other through a communication module 112, 122, 132, and thus the machines can exchange information with each other. For example, the operational parameters like running speed and engine status may be provided by one work machine to be available at a second work machine. The work machines have a control unit, through which the operational parameters can be adjusted. According to an embodiment, the work machines 110, 120 and 130 are operating on the same work process—a job—and an identifier of the job (job id) is maintained in the memory of the control unit. This allows the monitoring and even control of the other work machines that are operating on the same job without the danger of interfering with a work machine that is operating on another job.

The control unit of a work machine may comprise a connection to the communication module of the work machine, whereby the control unit may be able to display information from the shredder, wheel loader and screen over the wireless connection. In addition, the control unit may have functionalities for keeping working hour logs for operators, a user interface that is able to support the operator in using the work machine, and target/achievement display of the efficiency of the operator. Alarm logs, maintenance monitoring and other machine status information from all machines connected to same job may be available for display at the control unit. Additionally, a log of the times and durations of an operator running a machine may be kept so that the status and efficiency information may be matched with the operator. This may provide a way to form operator-specific efficiency information as reports to the operator so that he/she is able to improve the efficiency of his/her work. Here, it needs to be understood that the system may keep a log for a process where multiple operators operate multiple machines, thus creating a shared log for these operators.

The above information, e.g. efficiency data, may also be monitored remotely at a computer, e.g. through a web browser interface, and printout reports may be obtained. The efficiency data obtained from work machines working on the same job (sharing a job id) may be stored into a database so that the performance of an operator may be compared with the performance of other operators for example on the same site or, if the data is collected to a central server, even across sites or across countries in a global manner. Efficiency data may be understood to be any data that allows the formation of figures related to productivity and/or economic profitability, yield or such.

Figure 1B:
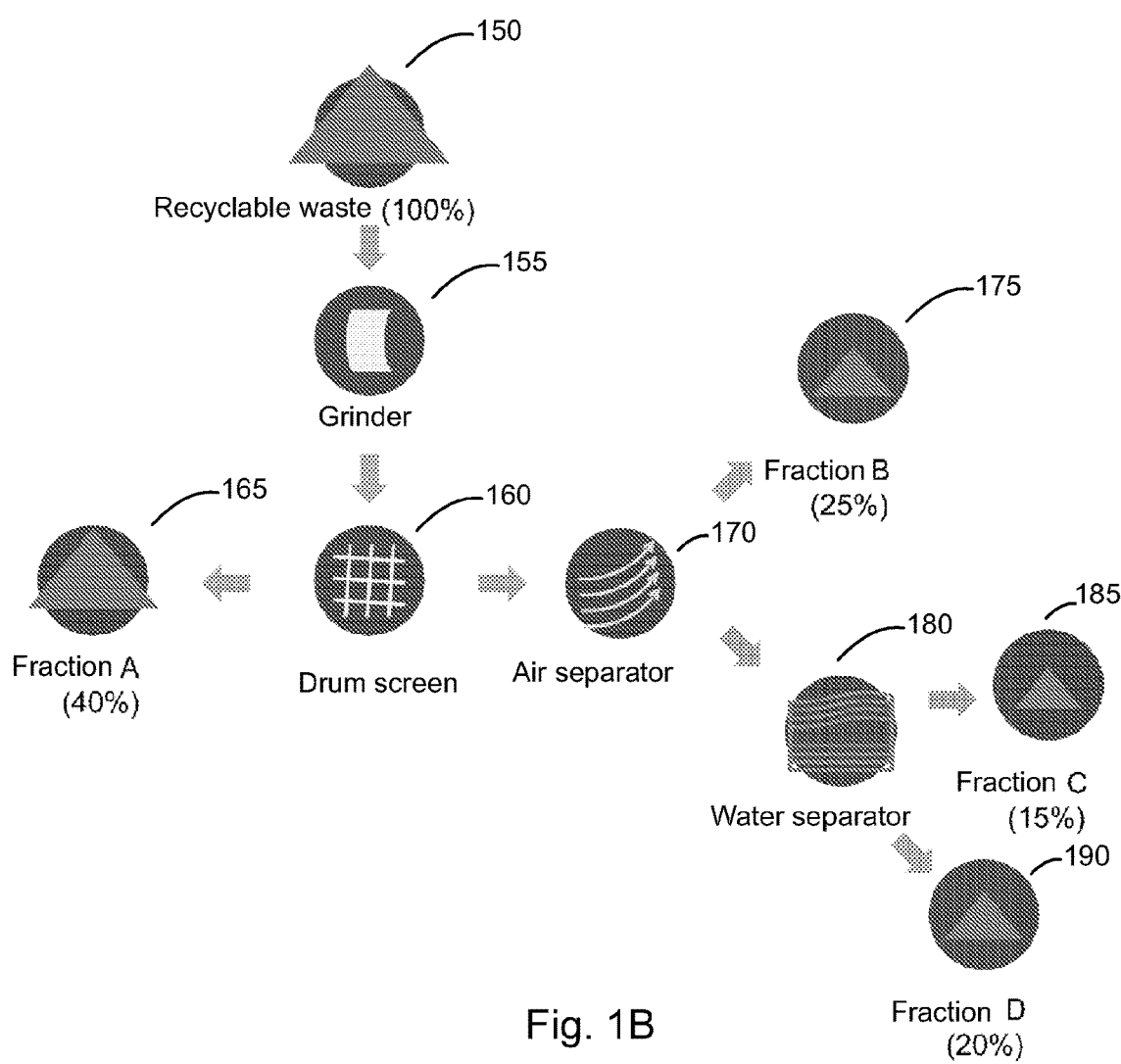
FIG. 1b shows an example process flow for recycling work machines.

FIG. 1b shows an example process flow for recycling work machines. The recyclable waste 150 is input to a shredder 155. Subsequently, the output of the shredder is put through a drum screen 160. The drum screen 160 separates a fraction A 165 from the processed waste. The remaining screened and processed waste is put through an air separator 170 to separate fraction B 175. The remaining waste may then be put through a water separator 180, and as an output, two fractions C 185 and D 190 are produced.

The various work machines operate in a chain, so that changing the operational parameters (like speed or grain size) at one work machine has an effect on how the work machine is able to accept input from the earlier machine in the chain, and how much and what kind of output the work machine produces to the next machine in the chain. If the parameters are chosen wrong, the output efficiency of the whole system suffers. In embodiments of the present invention, it has been realized that one of the reasons for suboptimal operator behavior is that there is no accurate information available to the operator on various work machines working on the same job. By transmitting a job id from the first work machine to another and sharing the same job id, the operator can more easily monitor the efficiency of the process. Operational parameters of work machines may also be set based on the selected or received job id.

Figure 2A:
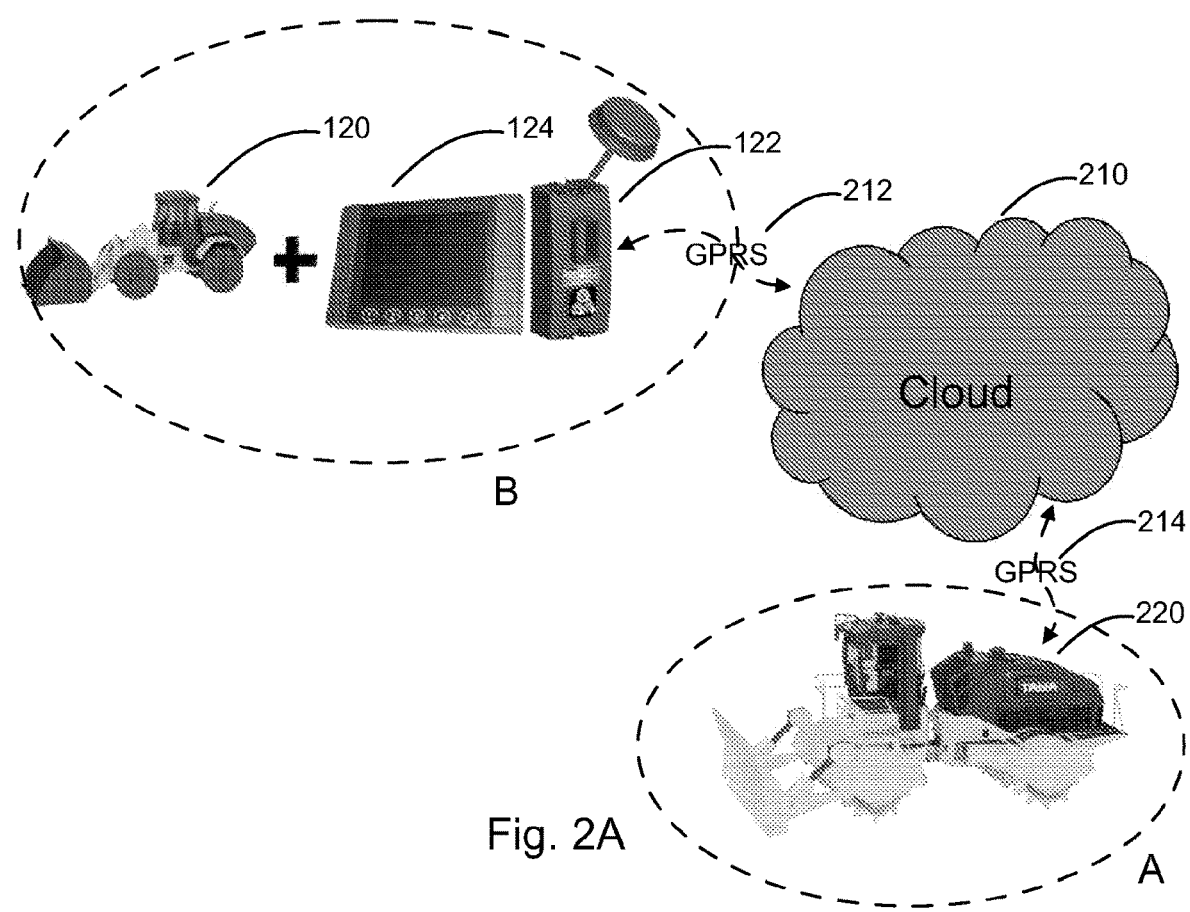
FIG. 2a depicts an example of a work machine according to an example embodiment.

FIG. 2a depicts an example of a work machine according to an example embodiment, as well as connection to another work machine through a cloud. The wheel loader 120 comprises a control unit 124 with a user interface for receiving control input from a user, and a communication module 122 for connecting to other work machines and/or to a cloud 210. The connection to a cloud may be realized through a cellular radio communication network 212 like a general packet radio service (GPRS) data connection. The modules 122 and 124 may be installed to the work machine 120 after manufacture of the work machine, that is, as an add-on installation. In such case, the control unit may be arranged to read data from the machine bus to be able to provide efficiency information. This reading may be arranged e.g. inductively so that no alterations are needed to the pre-existing hardware. There may also be work machines like a compactor 220 that are equipped with a control unit, user interface and a communication module at time of manufacture.

Figure 2B:
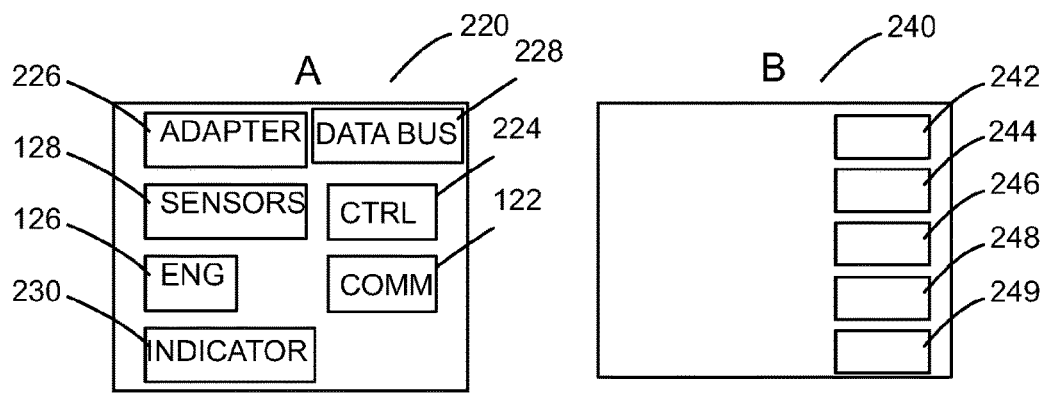
FIG. 2b shows a block diagram of a work machine according to an example embodiment.

FIG. 2b shows a block diagram of a work machine according to an example embodiment. A work machine A 220 for recycling or waste processing may comprise a control unit CTRL 224 that is arranged to control the work machine and the communication module so that the work machine can connect to another work machine and transmit or receive a job id for use in controlling the operations of the work machine. The work machine may comprise a communication module 122 arranged to transmit said job id and to connect to another communication module of another work machine. The control unit 224 may receive information on the operation of the work machine engine 126 and information on the material processing efficiency from the sensors 128.

The work machine may comprise a data bus adapter 226 configured to receive data from a data bus 228 of the work machine, the data being indicative of efficiency of said work machine in the current job. The data bus 228 may carry machine control signals, and the data bus adapter 226 may be able to read these signals e.g. through an inductive coupling or in another contactless manner. In this manner, no changes to the existing data connections of the work machine are needed, for example, wires do not need to be opened and soldered. The data bus adapter 226 may be connected to the control unit 224 and the communications module 122.

The control unit may also be connected to a visual indicator 230, so that the control unit 224 and the visual indicator 230 are arranged to indicate visually the work machines having the same job id. This may happen e.g. by sending an optical signal (light) having certain physical characteristics produced by said visual indicator such as the color and/or blinking pattern of light. In this manner, it may be easily seen what machines in the area are working on the same job and thus share a job id.

In a general manner, the work machine may comprise means for carrying out method according to any of the embodiments described in the context of FIGS. 4a and 4b. Such means may be computer processors, memories, communication modules for communication and such.

To control the work machines effectively in an interworking situation, the work machine may comprise means for receiving a control input from a user, this control input being suitable for starting the operation of the work machine. For example, an arrangement of receiving a key, receiving an access code or such may be implemented at the work machine. The work machine may then be started by this control input, and another control input may be received from the user for selecting a current job for the work machine. This may happen e.g. through a user interface of the control unit. There may also be means for transmitting a job id so that other work machines may use the job id in joining to the current job (the job id identifier corresponds to the current job selected for said first work machine), e.g. by sending the job identifier to the surroundings over a radio connection, or through a server or other network where the job identifier is not transmitted directly to the other work machines.

A second work machine B 240 (any work machine) may comprise means 242 for receiving a control input from a user for starting the operation of said second work machine, means 244 for starting said second work machine based on said first control input, means 246 for receiving a job id from the first work machine, wherein the job id having been transmitted from the first work machine for other work machines to use in joining to a current job of said first work machine, where the job id corresponds to the current job selected for the first work machine. There may also be means 248 for receiving a second control input from a user for selecting a current job for the second work machine, and means 249 for selecting a current job for the second work machine based on the second control input and the received job id 249.

That is, the same job may be selected at the second machine by receiving the job id from the first machine.

Figure 3A:
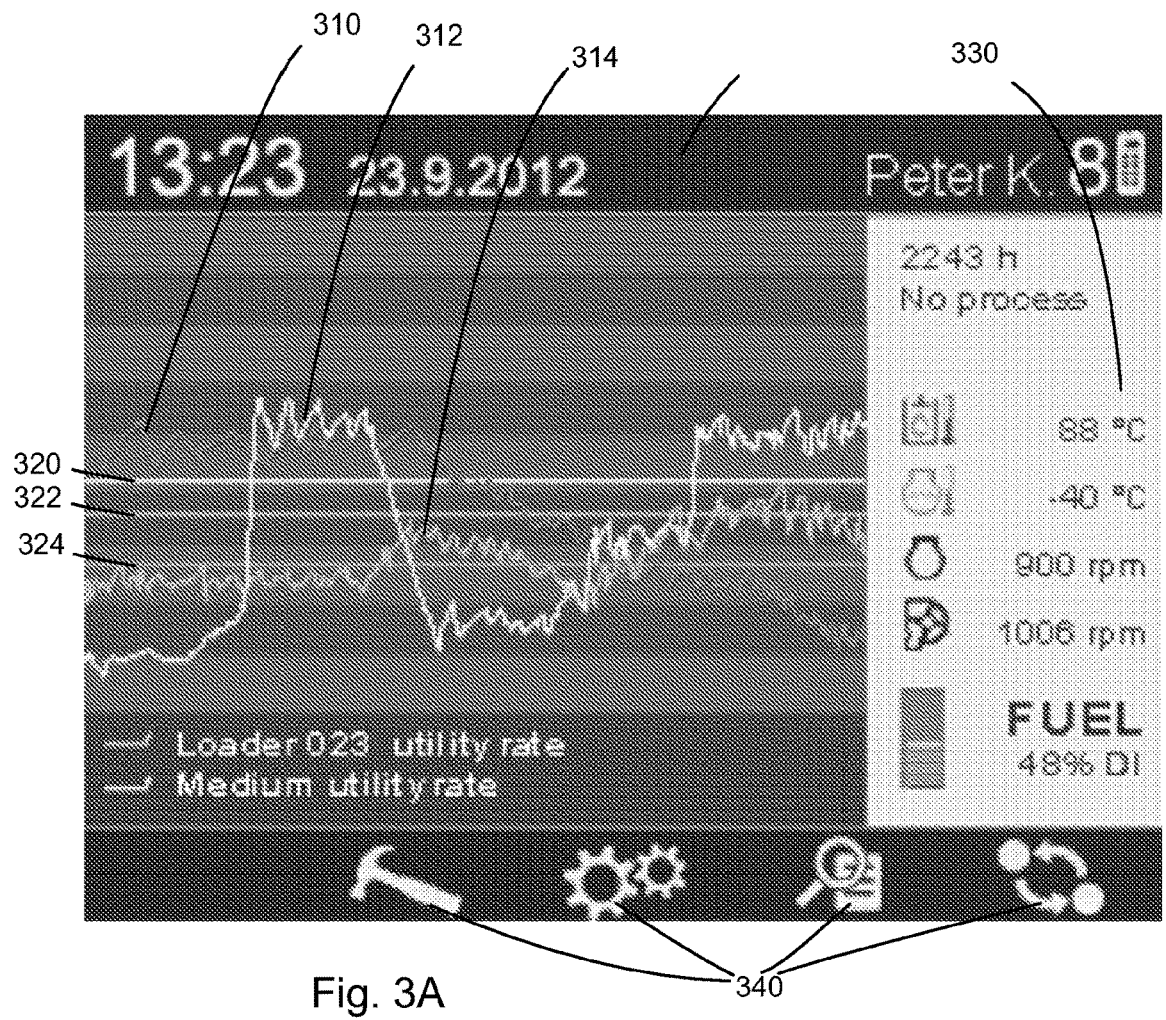
FIG. 3a shows a control interface with machine efficiency indicators for controlling a work machine according to an example embodiment.

FIG. 3a shows a control interface with machine efficiency indicators for controlling a work machine according to an example embodiment. In the example control interface, the efficiency of the work machines that share the same job id (that have joined the same job) is displayed with the curves 310, 312 and 314, one efficiency curve for each of the three work machines in the current job. From these curves it can be seen that the efficiency rate of work machine number 2 corresponding to the curve 312 is fluctuating significantly. The operator can deduce that the machine is not being fully utilized, and can adjust his work methods to improve utilization.

Also displayed on the control interface are the medium utility rates 320, 322, 324 for the different work machines of the fleet of machines that the operator's machine belongs to, or global comparison values across fleets and countries. Such medium utility rates can also be displayed for other operators either on the same work site or downloaded from a database that stores such efficiency information for other work sites and operators. An advantage of displaying other operators' utility rates on the control interface is the operator is able to see that he may not be performing his work in an optimal manner and he may thus be able to improve his efficiency. The display of other operators' efficiency information is achieved by the use of the job id to identify the job that is being done at each moment, so that when the job characteristics (e.g. material, machine configuration) are stored into a database, similar jobs can be compared. In other words, the use of a job id to identify each job makes the logging of efficiency information more accurate compared to a situation where just the efficiency information for a certain machine were to be logged.

Figure 3B:
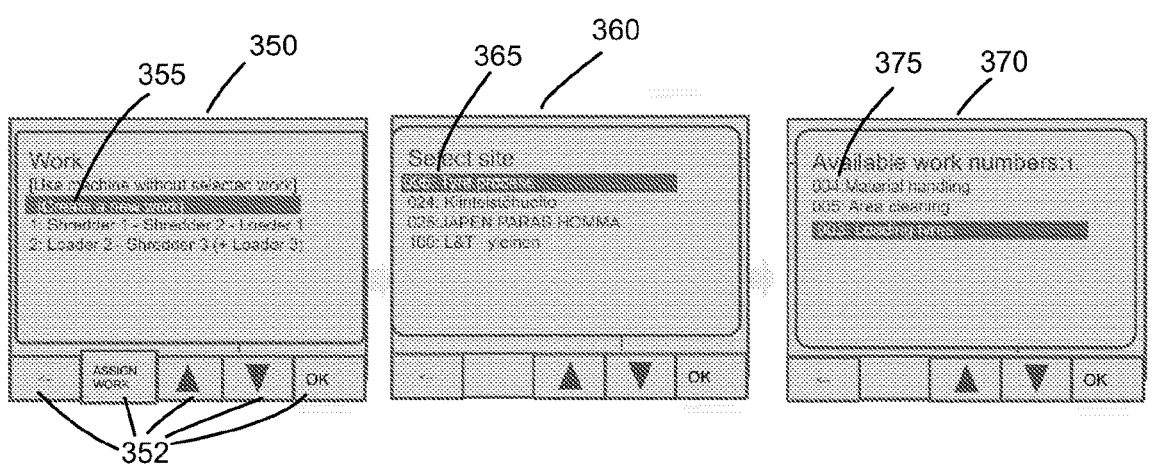
FIG. 3b shows control interfaces for controlling a work machine and initiating inter-working of work machines.

The control interface display also shows work machine status information 330, possibly captured from the data bus of the machine as explained earlier, and various control symbols 340 for accessing other views in the user interface. The hammer symbol in 340 provides access to job management (based on job id) as shown in FIG. 3b. The next symbol provides access to machine setup of the work machine, and the following symbol brings reports, logs and alarm lists on the screen. The last symbol allows the user to view the information of the fleet of work machines in the job.

A material report e.g. as a printout, data file or electronic document like a PDF document may be produced from the efficiency data that has been logged for a plurality of work machines, work sites and configurations. The material report may show the produced output in tons or m3 etc. of material, production costs per unit, and productivity per time, so that the operator company may see the productivity information for the process. The report may display productivity comparisons against the historical data like best historical productivity on own sites, and comparisons to other companies and sites. This is enabled by the collection of efficiency data associated with a job identifier, that in turn allows to find out the work machine configurations and work types (comprising information on what material has been processed) that have been carried out, thus making the comparison between different sites more accurate. This helps the operator to control the processes better to achieve a higher efficiency.

An operator report may display the produced tons of material and production costs per ton for a specific user, again compared to other operators. This may enable to control the process so that different human operators are able to carry out their work more efficiently. The information may also be used as a basis for producing reports for computerized salary payment systems to make the production-based incentive calculation easier and more accurate. Comparisons even on the global level between operators may be used to increase efficiency, and for adding awareness of own level compared to others.

The system may also be used so that the operators are instructed on how to operate the work machine configuration in a more efficient manner. For example, the efficiency curves 310, 312 and 314 may have textual cues associated to them so that the operator may more easily achieve a high efficiency. For example, there may be an instruction saying "increase load speed to avoid idling the shredder" or "reduce shredder speed" if the shredder is being loaded in an un-even manner. The system may collect operator specific operations log so that the manner of working may be analyzed later e.g. from the paper print-out. Things like input rate, output rate, engine load, utility rates, uptime/downtime of work machine, idle rate, productivity of work machine, malfunctions, service data and times, operator hours and times, and operator efficiency, and other such information may be logged as efficiency data. The system may also instruct the operator on the spot with predictions and instructions, e.g. by giving out a message "shredder 1 will be out of material in 40 seconds, get new load of material" when the system has determined from the current efficiency data that the shredder 1 will have processed all its current material in 40 seconds.

The system may have an additional component where other work machine's information may be shown, and even the locations of different work machines on the work field may be displayed.

The different views of the system may have titles that are the same in all systems so that navigation is easier and telephone support may be given in problem situations. The user interface may adapt to different working conditions like dark or bright lighting. The user interface may provide visual feedback to the user on selections, e.g. display graphically a work machine configuration that has been selected so that the user can easily see whether he has selected the correct configuration. As described, the user interface may also show all kinds of information for the work machine for the user to be able to see the machine status. The user interface may also help the user in troubleshooting, e.g. when there is a machine malfunction. Controls for various parts of the work machine may be implemented on the user interface through various user interface control elements, for example for extending the ground supports for the machine to stabilize the machine mechanically, or controlling the conveyor structure to be in transport position or in working position. Emergency stopping control may also be implemented on the user control interface.

FIG. 3b shows example control interfaces for controlling a work machine and initiating inter-working of work machines. The joining of a job may happen as follows as a user interface control sequence. In the first phase 350 of receiving control input from the user to the work machine, the job to be carried out may be selected. Alternatively, a new job may be defined. A selection control 355 on the user interface may be used to receive the control input-to create a new work. The control input may have associated soft keys 352 (hardware input buttons associated with the control elements 352 on the user interface), or a touch screen may be used, where software buttons respond to touch directly. The work machine control software may have different work configurations determined and displayed by the software. The user may be able to create a new work configuration or select from the pre-existing work configurations, that is, the jobs that are currently being run by some work machine and whose job identifiers are being transmitted. There may be a work configuration identifier, that is, a work identifier associated with each work configuration. This work configuration identifier may be such that it is the same at each work machine—that is, throughout the work machine system—so that the configuration of the work machines may be understood later when efficiency data is being analysed. Alternatively or in addition, the work machine identifiers or work machine types may be stored in association with the work machine configuration. This information may be sent to a central network database for associating efficiency data with a certain type of work machine configuration, certain work machines, or certain work machine types.

In the second phase 360, the work site (work type) may be selected. These sites may be pre-created in the software by an operator, and stored for later use. There may be pre-created sites or work types 365 in the system for the user to select from. A user with control rights, e.g. a site manager, may also create a new site, e.g. through a web user interface. The pre-created sites may be such that they have an associated work site identifier (e.g. 005 for tyre process and 024 for property management). Alternatively or in addition, description and information (like geographic coordinates of the site) may be stored for the work site. Again, the work site information and identifier may be sent to a central database in association with efficiency data collected for the work machines and the work process so that efficiency data for similar work at different places may be compared.

In the third phase 370, a work number may be selected. For example, different work numbers 375 may exist for material handling (004), area cleaning (005) and loading tyres (003). The purpose for selecting a specific work number is to be able to associate the work machine efficiency data to the specific work that is being carried out, the material that has been processed and what settings have been used for processing the material, together with having the information that the work is carried out at a certain site and with a certain work machine configuration. This enables the comparison of work efficiency between different operators, different sites and different work machine configurations.

For the purpose of controlling the inter-working of work machines so that efficiency data may be compared between different sites, the control data described above and shown also on the user interface may be stored as a control data structure. Such control data structure may be embodied as a signal or as a structure on a non-transitory data carrier comprising the data structure for controlling work-machine inter-working and/or a work machine database system, the data structure comprising a plurality of entries relating to a plurality of work machines, said entries comprising efficiency data, machine identification information, user identification information and a job id as described earlier, the entries being configured to be suitable for producing efficiency reporting data as output, the efficiency reporting data being characteristic of efficiency of the user and/or the group of work machines, and/or the work machine configuration.

The forming of the job identifier (job id) will be described next in the context of an example work machine configuration.

First, the user Sami (user id 123) starts a crane (work machine id 475), chooses a work site (site id 9 for company GREAT_FIRM) and work number (work number 4 for material handling). The job id can now be formed as ID123-9-4*475. That is, the job id may be a string that contains identifiers for the user, the site, the work type and the specific work machine. The job id may comprise fewer identifiers than in this example, or more information (more identifiers) than in this example.

Next, the user Sami starts a shredder work machine (identifier 440D), and the system suggests that the shredder is joined to the work 9-4 (GREAT_FIRM material handling). Sami then chooses the work 9-4 as suggested by the system, and selects the preset work machine setting 7 (material type: tires). Now, the team job id will be ID123-9-4*475-440D. The total job id may not be visible to the user.

Then, Sami starts another shredder machine of type 440D, and again the system suggests joining the work 9-4 by showing the corresponding text description to the user. Sami chooses work 9-4, and the system automatically selects the preset 7 (material type tire), because the job id carries the information that tires are being processed. The new shredder machine system enquires input from the user on the work machine configuration whether the new shredder will be added to the back or to the front of the first shredder machine, in parallel, or not be connected to the same material line. Sami chooses that the new shredder will be in the front (the default suggestion was the back). Now, the new job id becomes ID123-9-4*475-440D(2)-440D. Had the new shredder been joined to the back, the job id could have been ID123-9-4*475-440D-440D(2). Had the new shredder been added to the side in parallel, the new job id could have been ID123-9-4*475-440D/440D(2), indicated for example by the slash. In this manner, all the machines for the work are chosen, and their configuration (arrangement with respect to each other) is also chosen. This information may be carried in the job id as described.

As described, the system will form a team of the machines joined to the same work, and this team will share a job id. The job id is formed in the machines, and sent between machines over a wireless connection, like a zigbee radio link. This formation and information content of the job id data structure enables the above described comparisons of efficiency. If the user works with the same configuration on several days, the same job id may be used. This makes it faster to start work in the morning, which increases efficiency.

When the work shift changes, the operator of the work machine configuration may transfer the work to another user who has joined the work, or simply signs out through the user interface, or by removing the control key. If a new sign-in does not happen, the work with the first user id ends. If the work is transferred to a new user, the job id is modified in all machines of the team accordingly. Another user may also join the work that was created earlier.

The operator may have a key, e.g. a USB key or a radio interface key that stores the user's identification, and possibly carries the rights of the user, that is, indicates what operations the user is allowed to control on the work machines. The key may also act as a security element in such a manner that if the key is removed from a work machine and not connected to another work machine of the team (the same job id) within a time limit, all the machines of the team are stopped. The key may also enable the user to take control of a configuration of work machines (a team).

Different levels of authorization associated with the key may e.g. be "user", "maintenance", "factory" and "development". For a user, operating basic user interface control screens, diagnostics, troubleshooting, operational model selection, language and display settings may be allowed. For a maintenance key, the additional allowed levels may be software update, signing off maintenance jobs, viewing operating hours, running oil pumping from screen for maintenance, and disabling a sensor for a certain time like 2 weeks (to avoid unnecessary alarms before the sensor can be changed). For a factory key, permanently disabling a sensor, setting basic configurations, serial numbers etc. may be allowed. For development keys, all changes may be allowed.

FIG. 4a shows a flow chart of a method for initiating inter-working of work machines according to an example embodiment. In phase 410, a first control input is received from a user to a first work machine, the first control input being suitable for starting the operation of said first work machine. For example, the control key of the machine may be entered and the key may be read by the machine. In phase 420, the first work machine may be started based on the first control input. This starts the work machine engine and allows operating the material processing means of the work machine. In phase 430, a second control input may be received from a user, the second control input being suitable for selecting a current job for said first work machine, as has been described earlier e.g. in the context of FIG. 3b. In phase 440, the current job for said first work machine based on said second control input is selected. In phase 450, a job id may be transmitted to surroundings of the first work machine for other work machines to use in joining to the current job, said job id corresponding to said current job selected for said first work machine. The job id may also be transmitted through a server or other network so that the job identifier is not transmitted directly to the other work machines. The job id may be formed as described earlier.

As described, the first control input may be received by means of a key, the key carrying access rights to at least the first work machine such that operation of the first work machine can be started with the key. When the key is removed, a key removal control input may be received indicative that the key has been removed from the work machine. Based on the key removal control input, a timer may be started in response. The operation of the first work machine may be shut down based on the timer reaching a predetermined value, and also/instead the transmitting of the job id may then be stopped based on the timer reaching a predetermined value. A joining indication may be received from a second work machine that the second work machine has joined the current job, and the timer may be reset based on receiving the joining indication.

At the second work machine, the operation may happen as follows. A first control input is received from a user to a second work machine, the first control input being suitable for starting the operation of the second work machine. The second work machine may then be started based on the first control input. A job id may be received from a first work machine, the job id having been transmitted from the first work machine, or from the work machine where the user has previously been logged onto. That is, the job is may be transmitted by the machine where the operator's key has last been inserted. The job id has been transmitted for other work machines to use in joining to a current job of the first work machine, the job id corresponding to the current job selected for the first work machine. A second control input may be received from a user, the second control input being suitable for selecting a current job for the second work machine, and the current job may then be selected for the second work machine based on the second control input and the received job id.

When the second machine has joined the work, the job id may be modified as described above, and communicated from the second work machine to the first work machine, or vice versa, or formed separately in different work machines.

FIG. 4b shows a flow chart of a method for controlling work machines according to an example embodiment. When a job has been selected (and thus a job id has been selected/formed) in phase 460, efficiency data related to the job id may be provided to a data system from work machines having the same job id. For example, the efficiency data from a work machine or for the whole team of work machines may be sent by a work machine to a remote network database. Information on optimal inter-working situation of work machines based on said efficiency data may then be formed using the data collected to the remote database. This forming of efficiency data in phase 470 descriptive of inter-working of work machines may be based on the job id, and, the efficiency data related to the job id may be displayed to the user with a comparison to an information on an optimal inter-working situation in phase 480. Based on this, the machine may be controlled in an improved manner in phase 490, and thus the improving of efficiency of operating the work machines by the user may be enabled.

In phase 490, another work machine may also be controlled directly (with machine-to-machine communication) based on the efficiency data to improve inter-working of the work machines, the another work machine having the same job id. That is, for example, process parameters may be adjusted such as settings of material to be processed in the current job at a current work machine, information on the adjusted process parameters may be sent to another work machine based on the another work machine having the same job id, and then the process parameters at the other machine may be adjusted.

The methods and data structures described here may be realized with the help of computers, the computers having processors, memory and other circuitry for processing and storing data, as well as input and output devices for receiving control input from the user and producing machine operation data and information to the user. The methods may be implemented in a distributed manner so that they are executed in more than one apparatus on more than one processor. The various work machines, control modules and server computers presented in this application may have software and data structures for controlling the operation of a work machine. As the methods may be implemented with software, it is clear to a skilled person that not all of the presented steps need to be carried out, but some may be omitted, and the operational sequence in which the different steps are carried may vary. Also, the individual steps may be carried out alone or they may be combined with other steps as the needs of the situation vary.

As said, the methods may be carried out with the help of computer programs, and such programs may be embodied as computer program products stored on a module, computer readable medium or even downloadable from a server as a signal over the air. The computer program product may comprise computer program code, the code being arranged to, when the code is executed on a processor of a system, cause the system to carry out the method according to the above description. The computer program product may comprise the computer program code embodied on a non-transitory computer-readable medium such as CD or DVD data disc or on a transportable memory like a USB memory stick.

Figure 5A:
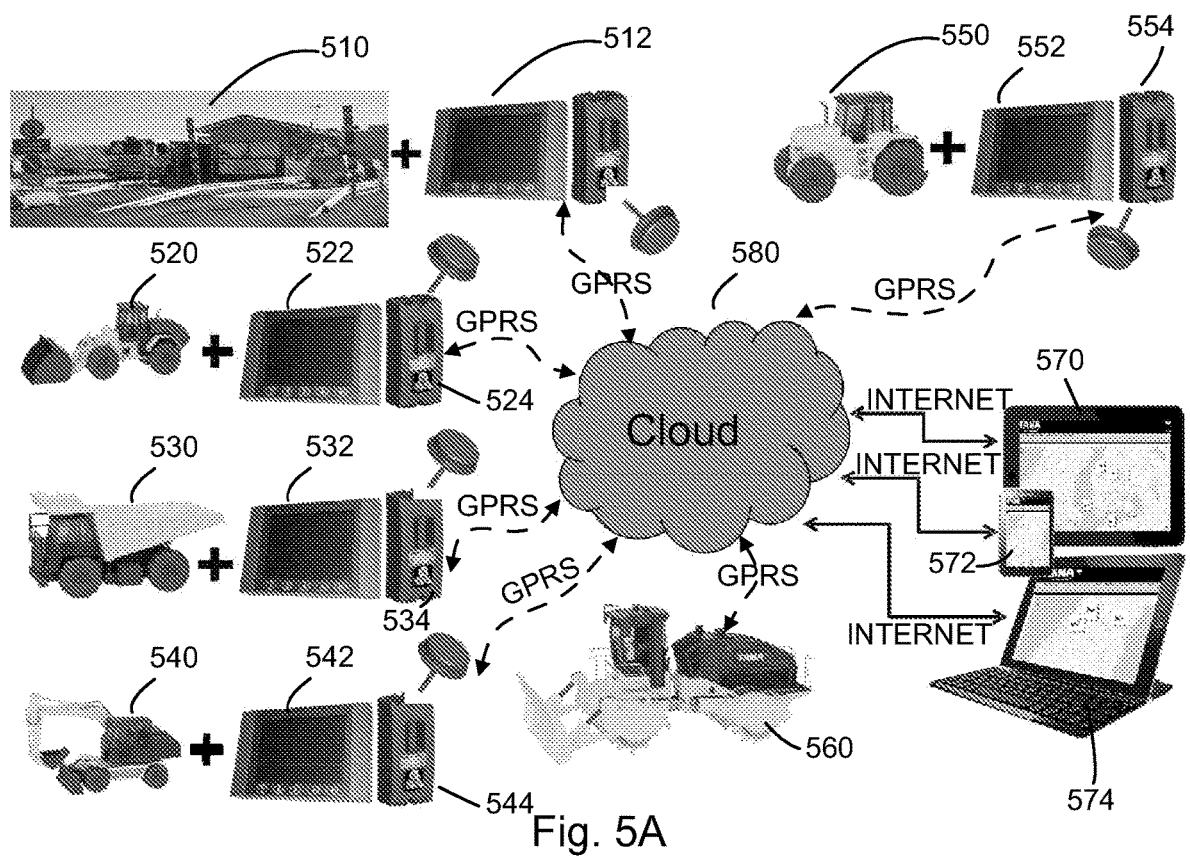
FIG. 5a shows an example setup of work machines for a landfill site.

FIG. 5a shows an example setup of work machines for a landfill site. Most of the work machines 520, 530, 540, 550 may have an adapter, control unit 522, 532, 542, 552 and a communication module 524, 534, 544, 554 that has been installed to the machine after manufacture. The firm facilities of a work site like a scale 510 may also have control unit 512 and a communication module. Some work machines 560 may have built-in control and communication modules. All the work machines are connected to the network, or a cloud, over their respective data connections (marked with GPRS on the example setup of FIG. 5a). In the cloud, the efficiency data is collected to a secure server, where it is for creating the data structure needed to build reports. The reports may be accessed and viewed over the internet using a web browser on a special monitor computer 570, common-purpose mobile communication device 572 or a tablet computer 574.

Figure 5B:
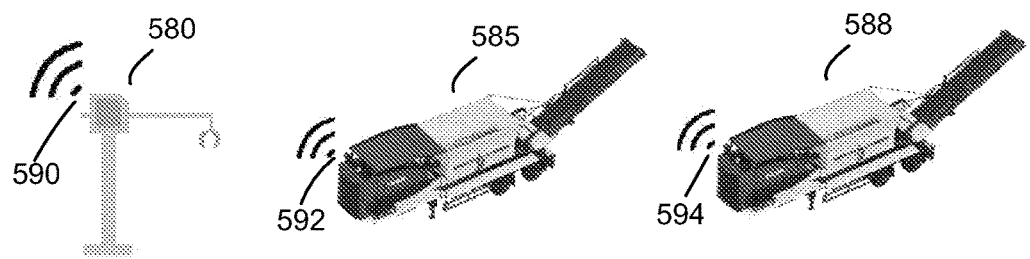
FIG. 5b shows an example of indicating work machines working on the same job.

FIG. 5b shows an example of indicating work machines working on the same job. The different work machines 580, 585 and 588 have been linked to the same job as described earlier, and they share the same job id. For the purpose of identifying which machines are working on which job, the machines may carry a visual indicator (an indicator lamp), sending for example blue light. The control unit of the work machines may be connected to the visual indicator, and the control unit and visual indicator are arranged to indicate visually the work machines having the same job id by physical characteristics of the indication produced by the visual indicator such as the color and/or blinking pattern of light. That means, for example, that once a work machine joins a certain job, it synchronizes itself to the other work machines and starts to emit e.g. blue light in a certain common pattern characteristic for this job.

The various embodiments of the invention can be implemented with the help of computer program code that resides in a memory and causes the relevant apparatuses to carry out the invention. For example, a work machine may comprise circuitry and electronics for handling, receiving and transmitting data, computer program code in a memory, and a processor that, when running the computer program code, causes the work machine to carry out the features of an embodiment. Yet further, a server may comprise circuitry and electronics for handling, receiving and transmitting data, computer program code in a memory, and a processor that, when running the computer program code, causes the server to carry out the features of an embodiment. The computer program product may comprise computer program code embodied on a non-transitory computer-readable medium, and the computer program code may then be loaded onto the work machine memory for execution.

The various work machines operate in a chain. The work machines are interlinked with each other. For example, changing operational parameters at one work machine has an effect on operational parameters of other interlinked work machines. A machine is able to inform an earlier machine in the chain how much the machine is able to accept input from the earlier machine, and/or whether the earlier machine shall change operational parameters relating to the input. A machine is able to inform the next machine in the chain how much and what kind of output the work machine produces to the next machine. Since the information may be shared with the earlier and/or next machines in the chain, operational parameters of the machines next to each other may be matched to get the best possible performance for the chain of machines. If operational parameters are not interlinked between the machines, or are chosen wrong, the output efficiency of the whole system suffers. Accurate, current, temporary information on various work machines working on the same job may be provided. This may enable following up, controlling and adjusting the work process, or the job, efficiently.

Figure 6:
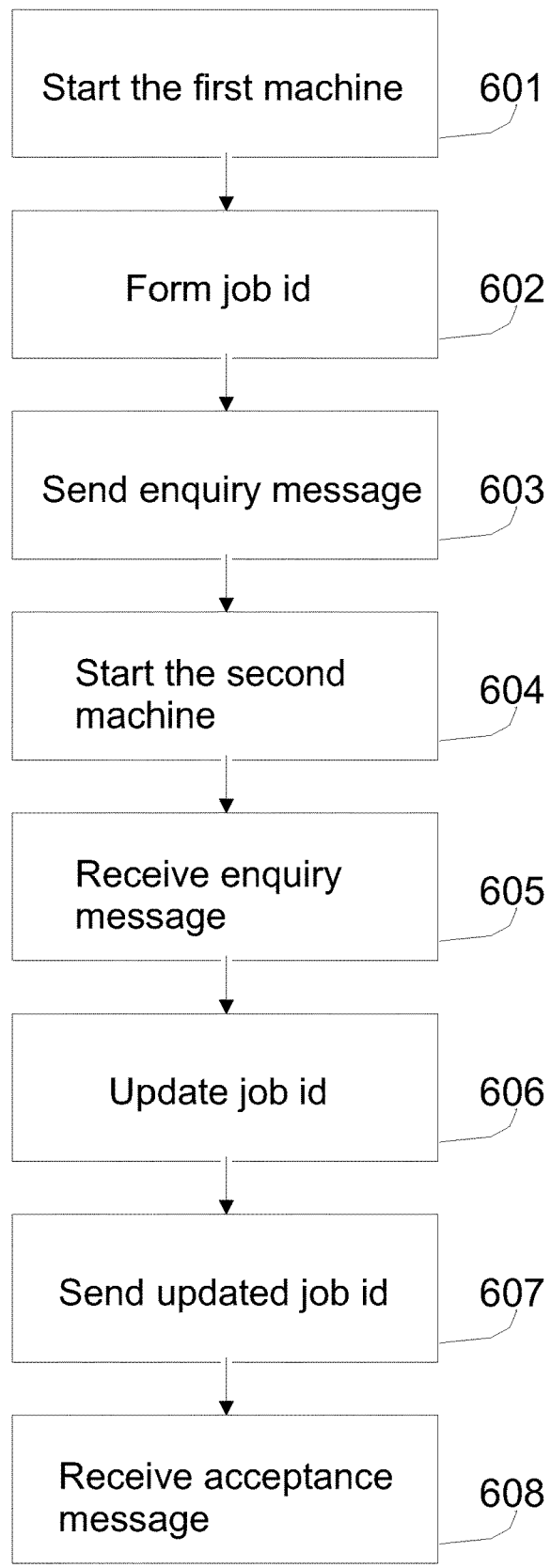
FIG. 6 shows a flow chart of a method according to an embodiment.

FIG. 6 shows a flow chart of a method for controlling work machines in a job. According to the method, a user starts a first work machine of a work process 601. Starting means that a first control input is received from a user to a first work machine, wherein the first control input is capable of starting the operation of said first work machine. For example, the control key of the machine may be entered and the key may be read by the machine. The user is for example M. User and he has a user identifier of ID123. The user may join a job by forming a job identifier 602 comprising used identifier (ID123) and work identifier. The work identifier may comprise a code or an integer indicating the selected work. The work identifier may indicate for example wood processing, tire processing, or some other work. The job identifier 603 may further comprise a machine identifier.

In an embodiment, the user may start a crane, which has a work machine identifier of 475. Then the user may choose a work site and a work number. The work site has a site identifier 9 and a work number has an identifier 4, which corresponds to material handling. Based on user selections, an identifier for the started job, a job id, is formed 602. The job identifier, job id, as formed based on the pervious example information may be ID123,9,4*475. According to embodiments, the job identifier is a string that comprises identifiers for the user and the job. In addition the job identifier may comprise work machine identifier. Further the job identifier may comprise the site, the work type, for example. The job identifier may comprise different number of identifiers, and/or more or less information (identifiers) than in the previous example.

The first machine starts sending an enquiry message 603 after the job identifier has been formed. The enquiry message comprises sender identifying formation and the formed job identifier. The first machine sends the enquiry message 603 on certain time intervals. The enquiry message 603 may be sent via local network, internet, or any wireless connection, such as Zigbee. Work machines on the message reach area, for example radio range, may read the enquiry message 603. A second machine may receive the enquiry message 603. If the second machine wants to join to the job, it may respond by sending a response message to the enquiry message 603. The first started work machine starts a job, to which other work machines may join. The enquiry message provides a permission for other machines to send a corresponding request message for joining to the job. Receiving an enquiry message is a pre-requirement for a machine to join to a job. The system may enable work machines to join and leave to/from the work process, i.e. the job. The system enables the job and the work machines of it to be controlled and adjusted via messages sent between the work machines.

Next, the user M. User starts a second machine 604. As in case of the first machine, the user inputs control input, which is received by the second machine and capable of starting operation of the second machine. The second machine is for example a shredder work machine, which has an identifier 440D, Since the first machine is sending the enquiry message 603, the started second machine receives the enquiry message 605. Based on the received enquiry message, the user of the second machine chooses to join the second machine to the current job. The second machine updates the job id received in the enquiry message 606. The user M. User chooses the work 9-4 as suggested by the system according to the received enquiry message, and selects the preset work machine setting identifier 7, which corresponds to material type of tires. The second machine updates the received job identifier by adding information relating to the second machine to the existing job identifier. Information relating to the second machine is in this example the second machine identifier, being 440D. The updated job identifier, job id, may be ID123,9,4,7*475-440D. The updated job identifier comprises information on the user(s), work site, work type, work machines joined to the job and their configuration. The updated job identifier is communicated to the network 607. The updated job identifier is sent by the second machine via a message. The message determines receiver of the message, being the first machine. Thus the first machine, sending the enquiry message knows that the message is directed to it.

The first machine, which has sent the enquiry message 603, receives the updated job identifier sent by the second machine 607. The first machine is determined as a receiver in the message comprising the updated job identifier. The first machine may check the received message, and the updated job id. The first machine may check that the received message is in a correct form. For example, the first machine may check and/or compare certain fields and decide based on a check and/or comparison, whether the received message for joining to the job is acceptable. One or more fields or parts of fields of a received message may be checked, for example a receiver field, a content field, a checksum, a job id and/or a receiver. The system configuration may be arranged to accept certain type of messages and/or check certain field(s) or data. If it is determined to be acceptable for the second machine to join to the job, the first machine sends an acceptance message. Receiver of the acceptance message is determined in a receiver field of the acceptance message, being the second machine. The second machine receives the acceptance message 608 from the first machine. The first machine sends the updated job id comprising information of the newly joined second machine to the network. The send message is attainable and receivable by all the machines of the job. Now the first and the second machine, as well as all machines joined to the job, share the updated job id.

Then, the user M. User starts another shredder machine of type 440D in a similar way that described with the previous shredder machine. The phases 604-608 of the FIG. 6 are repeated. The started another shredded machine is able to receive an enquiry message from the first machine (605). The enquiry message comprises the job identifier, which is now the current job id, which has been updated by the second machine. Accordingly, system suggests joining the work 9-4 by showing the corresponding text description to the user. When selecting to join to the work, the job identifier is updated accordingly (606). The user chooses work 9-4, and the system automatically selects the preset 7 (material type tire), because the job identifier carries the information that tires are being processed. The new shredder machine system enquires input from the user on the work machine configuration. The work machine configuration comprises information on whether the new shredder will be added to the back or to the front of the first shredder machine, in parallel, or not be connected to the same material line. The default may be to configure the work machines such that the later started is situated to the back, after the first started machine. The user may choose that the later started another shredder will be in the front, before the first started shredder machine. In this case the new updated job identifier becomes ID123,9,4,7*475-440D(2)-440D. Had the new shredder been joined to the back, the job identifier could have been ID123,9,4,7*475-440D-440D(2). Had the new shredder been added to the side in parallel, the new job identifier could have been ID123,9,4,7*475-440D/440D(2). Order of the machines in the job identifier corresponds to the order of the machines in the work site. Configuration of the machines in relation to each other is indicated by pre-determined signs. Parallel machines may be indicated for example by a slash mark in the job identifier. The updated job id is sent by the new shredder machine to the sender of the enquiry message (607), which is the first machine here. After the new shredder machine receives the acceptance message (608) from the first machine, it has been accepted to the job. The first machine transmits the updated job id to all machines of the job. The messages are transmitted via air and attainable by the machines. The three machines share the latest (current) job id. Correspondingly, following the phases 604-608 of the FIG. 6, all the machines, which are to be interlinked to join the common work process, are chosen, and their configuration, or arrangement with respect to each other, is chosen. This information may be carried in the job identifier as described.

As an example embodiment, a job identifier may comprise main user identifier ID123, work site identifier 9, work number 4 and a work mode identifier 7, relating to worked material, for example. In case of several users, the first joined user may be considered a main user. There may be a first entity in the chain, participating to the identified job, comprising entity identifier LT475 and being used by another user, identified by ID6529. The second entity of the chain, participating to the identified job, is arranged next to the first entity, in series with it, and comprises entity identifier BT1234. A third entity of the chain is arranged parallel with the second entity and comprises entity identifier BT5678. The fourth entity is arranged next to the third entity and comprises an entity identifier LT0944. The fifth entity participating to the identified job comprises an entity identifier LT2200. The fifth entity is arranged to situate out of the entity line of the other entities. The job id that the entities share may be ID123,9,4,7-LT475(ID6529)-BT1234/BT5678-LT09441T2200. Different kind of marks and signs may be used. The job id may comprise a work identifier and a user identifier. The job id may further identify at least one of some details of the job, another user, the entities participating to the job or the work process and arrangement of the entities in relation to each other.

In an embodiment, at least one of the machines may be started and used or operated by another user. For example a job may contain one or more wheel loaders operated by user(s) different from the M. User as described in the previous. The user identifier, user id, for each user related (participating) to the job is indicated in the job identifier. The user identifier(s) are associated with the corresponding machine information so that the job identifier clearly indicates the user(s) of the machines. For example, a user of a machine, which is different from the main user identified in the job identifier, is indicated in connection with the machine. Where the main user has started several machines, as M. User in the previous, the main user need not be indicated with each machine separately, The main user is a default, if nothing else is indicated. Possible other user(s) are indicated with the corresponding machines.

As described with the FIG. 6, the work machines are interlinked with each other to join the same work process. The work machines sharing the work process share a job identifier. The job identifier is formed in the machine joining to the work process, and transmitted to the other interlinked machines. All machines share the job identifier and have information of the job identifier, for example on the job they all have joined and/or on other machines and their configuration. The job identifier is communicated via messaging system back and forth between the work machines, carried in the machine to machine messages.

Figure 7:
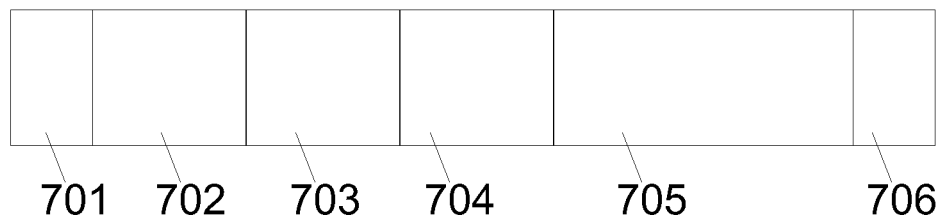
FIG. 7 shows a message according to an embodiment.

A work machine according to embodiments is able to send and receive messages. The work machine is arranged to share information via messages. FIG. 7 shows a message according to an embodiment. The message may comprise fields indicating a start of a message 701 and an end of a message 706. The start and end of the message may be indicated using certain mark or sign, for example $ and *. A receiver of the message recognizes start and end of a received message via the corresponding message fields 701, 706. The message comprises a field indicating a sender machine 702 of the message. The message comprises a field indicating a receiver machine 703 of the message. The sender machine field 702 and/or the receiver machine field 703 may comprise an identifier of the corresponding machine. A message may be sent to one or more receivers indicated in the receiver machine field 703. According to an embodiment, all interlinked machines working on a same process, i.e. sharing a job and a job id, may read all messages relating to the job. The message further comprises a content field 705. The content field 705 comprises information content, for example a job identifier. The content field 705 may comprise different kinds of information depending on the message and purpose of it. The content field 705 may comprise a job identifier. The content field 705 of the message may comprise a message type, which identifies, what kind of information is sent. The message type may indicate that the message carries graphical data, work information, alarm information, machine model, machine control information, information on joining a job, information on transferring a job, information on starting communication, information on changing work mode or information on leaving a job, or exiting it. The message type comprises an integer identifying the type of the message. The receiver is able to recognize the type of received data based on the message type indicator in the content field 705. The message type is followed by more detailed information of the message type in question. The information content of the message type may be presented in parenthesis after the message type. The message type may be indicated using a predetermined integer, for example. A role of the sender machine is indicated in the message field 704. For example, the role may be identified to be a slave machine. Further, a communication system according to embodiments comprises two different kind of master roles. The roles are discussed in more detail in the following.

A job may comprise an operation master. One machine joined in the job has a role of an operation master. The operation master role includes configuring how the machines of the job are linked to each other and what is the order between the machines. The operation master shares information and is able to control machines of the job and operational parameters of those. When a user starts a first machine, the user may use a key, for example a universal serial bus (usb) key or a radio interface key. The key may comprise user's identification, and possibly rights of the user. The key may indicate what operations the user is allowed to control relating to a certain job or to certain work machine(s). The first machine, into which the user has entered and started using the key, becomes an operation master in the chain of the interlinked machines sharing a job. The operation master is a machine, which has been physically started by the main user and which is operable by the main user. The operation master may be the first physically started machine in the chain of machines, or it may be replaced by some of the latter physically started machine(s). The operation master is the work machine, to which the main user has last started and/or logged in. The main user may be the user who has first logged in the job and/or started a first machined of the job. The operation master may be for example a load wheeler, which the main user is using during the job. Operation master may be used to follow up the work process by the main user. The operation master may display information on the work process. The main user of the operation master machine may follow up, check and adapt the work process and parameters of it. For example, the operation master may be used to read and offset alarms throughout the chain of the machines. The operation master sees and is able to control all machines in the job. The operation master role may be transferred to another machine. If another user has joined the job as a user of a machine joined to the job, it is possible to transfer the operation master role to the machine used by the other user. An another machine may become an operation master of the job, if this transfer of the operation master role is allowed by the current operation master. Thus the role of operation master is transferred to another machine having a new user. After this, if the new user starts a second machine and uses it, the second machine becomes an operation master. The operation master may ensure that the machines of the job are operational. If the same user starts more than one of the machines interlinked in the same job, the operation master may be selected to be the machine, which was last started (and logged in) by the user. The operation master may be the entity used by the main user.

User keys may comprise user rights. The user rights may determine, what kind of settings and/or parameters of a machine the user may change. Different user rights, or levels of authorization associated with the key, may be for example "user", "maintenance", "factory" and "development", from lowest to the highest rights. For a user, operating basic user interface control screens, diagnostics, troubleshooting, operational model selection, language and display settings may be allowed. For a maintenance key, the additional allowed levels may be software update, signing off maintenance jobs, viewing operating hours, running oil pumping from screen for maintenance, and disabling a sensor for a certain time like 2 weeks (to avoid unnecessary alarms before the sensor can be changed). For a factory key, permanently disabling a sensor, setting basic configurations, serial numbers etc. may be allowed. For development keys, all changes including creating new items, may be allowed.

In addition to the operation master the chain of the interlinked work machines sharing the job identifier comprise a communication master. The communication master may be different machine than the operation master of the job. A machine having a role as a communication master is selected based on priority, which may be based on priority list. Priority may be given based on machine type. The priority may be given to a machine, which is always present in the job. It may be a machine that is necessarily part of the job. If there are optional machines, which may join the work process, but are not necessary for the work process to continue, such optional machines are not given priority for the role of communication master. The communication master is kept as stable as possible. Preferably the role is not changed during the work process. If the work process comprises two same type of machines, one of which may become a communication master, the communication is selected based on the smallest serial number. For example, wheel loader is not selected or given priority as a communication master, since its working area may be wide. It may go far from the other work machines of the job to get material to be processed. Thus the wheel loader may go temporarily be away of reach of the messaging system. The messaging system may comprise reach area of for example 100 meters, or less than 50 meters. However, the operational range of a used messaging system and/or wireless connection may vary. In an example, the wheel loader may have a role of an operation master, but not a role of a communication master. Rather, the communication master may be selected from the work machines operating in rather stable places in the chain. For example, the communication master may always be at the operational range of the messaging system. It is possible that the wheel loader has role of a communication master and/or one machine comprises roles of an operation master and the communication master. The communication master machine is arranged to control the work process. The communication master is aware of status of the process and all the messages sent. It knows the last sender of the messages and the current sender. Time slots for sending messages are adapted according to work machines and amount of those. Allocation and structure of the time slots is not constant.

A role of the sender machine is indicated in the message field 704. The role may be an operation master machine, a slave machine, an operation master being a communication master, or a slave machine being a communication master. The role defines role of the machine in the work process.

A messaging system is described next. A work machine of the job is given a turn to send a message. Each work machine of the job may be given a turn to send a message, or a communication turn. The communication turns may be implemented successively, one machine after the other, one machine in turn. A communication cycle, in which each machine of the job is able to send their message(s), may last for example few seconds, for example 2-3 seconds, or for example 1 second. The time of the communication cycle may depend on sent messages, message sizes and number of messages sent on the communication cycle. Size and number of send by one machine may vary. The communication master determines which messages are to be sent, in which order, by which machines. The communication master indicates communication turns for the machines of the job for sending messages. Each machine may see any message sent by a machine of the job. The message comprises a field indicating a receiver, which may be one or more machines of the job. The receiver(s) then know which messages are sent for those and receive the message. The communication master is arranged to give turns to all machines of the job. The communication master may give communication turns in the same arrangement of the machines as indicated in the job id. Alternatively, the communication master may give communication turns in an order reverse of the machines as indicated in the job id. In cases, where the order of machines in the job id relates to the order of the communication turns, the machines are aware of the communication order and communication turns of each other. In alternative, machines of the job may have certain priority order according to which the communication master gives the communication turns. A case may be that a machine may request for priority or the communication master may receive indication based on which it gives priority to certain machine. For example a machine sending an alarm message or an alarm message relating to certain property may be given priority when sharing communication turns. Thus order of the machines in the communication cycle may be dynamically adjusted, or variable. In practice the communication cycle is fast, so in many implementations simple sequential turns, for example according to job id, may be employed.

A machine being given a communication turn may not send anything. A communication turn given to the machine is maintained for a certain predetermined time, like less than a second, for example 500 ms. If nothing is sent, after the predetermined waiting time has passed, the communication master gives the turn to a next sender. In certain cycle, for example on every fifth communication cycle, each machine sends a machine type message. The machine type message may comprise information on type of the machine, like manufacturer identifier, machine model, machine type identifier and user identifier. The user identifier identifies the user who is connected to the machine, if any. The machine model messages works as heat beat messages, which provide information that the machine sending the message is in an operational state. The machine type message sent by the operation master comprises information on control of the lights of the machines. The lights of the machines in the same job are synchronized accordingly and the light pattern is chosen by the operation master.

The communication master may send an enquiry message, which contains the current job identifier. The enquiry message enables a receiver machine to join to the current job. The receiver machine joining the job modifies the job identifier received in the enquiry message. The receiver machine may add its machine specific information to the job identifier. In addition to the machine specific information, place of the machine in relation to the other machines of the same job may be indicated. A user identifier may be part of the machine information, if different from the main user already joined the job and identified in the job identifier. The modified job identifier is sent back to the communication master. The communication master may check that the received message is acceptable before accepting the message. Alternatively or in addition, the communication master may check that the machine sending the message containing a modified job identifier, is acceptable for joining the job. After the communication master has received the modified job and accepted it, it sends an acceptance message to the machine, which send the modified job identifier. The acceptance message indicates that the work machine has been accepted to the job. The machine has joined the job. After this all machines of the job receive and share the modified job identifier.

The communication master sends in its communication turn a work message, which comprises information of the current job. Each machine of the job receives this message and stores the job identifier. The job identifier may comprise a main user identifier and a work identifier. The job id may further comprise at least one of a machine identifier, work site identifier, work mode, the identifiers of the machines of the job, their mutual order, and user information, where different from the main user indicated already in the job identifier. In case of more than one machines, a common job identifier may indicate configuration of the machines of the job. For example, whether the machines are next to each other and/or work in parallel and/or are out of the working line and so on. Via this information all the machines know their mutual order in the work process. After a new work machine has joined to the process, all the machines of the job receive the modified, updated job identifier via a job identifier sent in a message by the communication master machine.

The communication master is arranged to share communication turn for other machines to send messages. The communication master may send a message, which indicates that the receiver, as identifier in the receiver field of the message, has a communication turn and may start sending message(s) accordingly. This way, the receiver gets an indication that it is given a communication turn, and the other machines see the message and know that they are not allowed to transmit. The message content field comprises a message type, which is indicated by an integer, the identifier of the receiver machine and its place in the chain of machines. The message type indicates that the message is for giving a communication turn. When a machine receives this message, it may start sending message(s). If more than one messages are sent during the communication turn, the machine sends as a last message a message indicating end of the communication turn. The communication master and other machines then know that the communication turn may be shifted to the next machine. The communication turns may be given according to order of the machine identifiers in the job identifier.

A machine may send an alarm message. In case a machine has an alarm, for example relating to it lacking oil, having values beyond threshold values, like temperature or oil pressure, or alike relating to its operation, it may send an alarm message. The message comprises in the content field a message type so that receiver(s) are able to recognize type of the message. Further the content field of the message comprises one or more alarms, which are indicated via identifier numbers and some further information relating to it, for example a value. The identifier numbers of alarms are listed in the machine specific file. The text information from the file is presented according to language settings, which are set and selected by the operation master. Only operation master machine can set off alarms. The alarm(s) may be set off by a response message. One response message may be used to set off one or more of the alarms in one alarm message.

A machine may send a control message to a machine next to it. For example, the control message may be sent to the previous machine in the chain. The previous machine in the chain receiving the message may adjust its performance according to the received control message. The machine receiving a control message from a machine next to it, may choose to act, for example adjust its parameters, based on it. The receiving machine may choose not to act based on the received control message. The operation master may enforce changes and/or settings of the other machines. The machines other than the operation master may send control messages, but may not be able to force the other machines to adapt or act based on the control message(s). The content field of the control message comprises identifier of the message type and for example a value. The value may be between 0 and 100, relating to speed of the automatic drive of the work process. Value 100 means automatic drive with full speed, while value 0 means stopping the automatic drive. Value 85 means automatic drive with 85% of the maximum full speed. There may be one or more values to be adjusted. For example, the machine may not be able to process all the input from the previous machine. Then the control message instructs the previous machine to slow down accordingly. The machine receiving a slow down instruction from the next machine in the chain, may send similar control message to the machine preceding it in the work chain. This enables controlling the whole process via messages. User input may thus not be necessary, but may be avoided or at least cut down.

A slave machine may send a message requesting change of work mode. Content of the message comprises message identifier (integer) and identifier for the work mode to be changed. The message identifier indicates what kind of message is in question and/or indicates where the following parameters relate. For example, a wheel loader may change the place, where it gets material for the work process, and/or the material type it brings to be processed.

A slave machine may send a log out message. It is sent to inform that the machine is exiting the current job. Only a slave machine may leave or exit the job by sending the log out message. The communication master modifies the job id accordingly, by deleting information of the leaving machine and modifying construction of the machines without the leaving machine. A kind of reduced job id is formed as the current job id. The communication master sends the modified job identifier. The other machines may be arranged to slow down, and/or stop working in response to seeing a log out message. In an embodiment, the communication master sends the updated job identifier message, according to which the machines are arranged to start over or speed up the work process without the logged out machine. In case one of two parallel machines leaves the job, the other work machines may slow down. The process maybe further adjusted via control messages sent by other messages to their neighbor messages. In case the only wheel loader leaves the job, the process is stopped by all machines, until a new wheel loader joins and starts providing material to the work process.

A work machine may be transferred to another user. In this case a transfer request message is sent. The main user, for example ID123 in the previous, may send the transfer request message. The transfer request message comprises in the content field identifier of the message type, identifier of the work to be transferred, which is the user identifier, and identifier of the work to which the work is to be transferred. The latter is the receiver of the message indicated in the receiver field. Thus the receiver, to which the work is transferred to, has joined the job and is part of the interlinked work process. If the receiver accepts the transfer, the transfer is done. The receiver updates the job identifier so that receiver work identifier replaces the earlier work identifier, which is thereby removed. The modified job identifier is sent and communicate to the other machines in the job. It becomes the new job identifier of the job. If the machine requesting the transfer was the communication master, also this role is transferred to the other machine. The new communication master starts to work according to its new role and controls the work process. The transfer request message may be sent for example when a work shift ends or changes. The operator (user) of the work machine may transfer the work to another user who has joined the work. A slave machine may simply log off and exit through the user interface, or by removing the control key. Corresponding log off message may be sent. A new machine or a user with the previously logged off machine may join to the job to replace the slave machine that has been logged off. If a new sign-in does not happen, the work with the first user id ends. In either case, the job id is modified in all machines of the job accordingly. The communication master may modify and/or update and/or transmit the job identifier.

If the user(s) work with the same configuration on several days, the same job id may be used again. This makes it easy and handy to start the work.

The key may also act as a security element in such a manner that if the key is removed from a work machine and not connected to another work machine of the work process (sharing the same job id) within a time limit, all the machines of the chain are stopped. The key may also enable the user to take control of a configuration of work machines of the job.

A message content relating to graphical data may be identified by the integer 1. Graphical data provides information for graphical display. The graphical display may show illustration of the received information in one or more of the work machines in the chain, and/or in a main display, which may be remote from the work machines. The graphical display may illustrate constantly updating view of information provided from the work machine(s). The graphical display is able to show different kind of data, so graphic identifier is put in a message in order to identify the graphics, for which the following values are to be utilized. The graphic identifier may be for example 58 for x-direction and 59 for y-direction, and the identifiers are chosen from a real time table, which may be used by the machines. The real time table and information of it, may be stored in machines, or in at least one machine or in a remote data storage, which is attainable and/or readable by the machines of the job. After the identifier, a value is provided. The value is for example 1.20 for x-direction and 1.00 for y-direction. In an embodiment values are provided in SI-units, and converted in a receiving end, where necessary. Then a scale is provided, for example 0-100 for x-direction and 1-60 for y-direction. In addition unit may be provided, where needed. The unit may be for example t/h for x-direction and l/h for y-direction. Based on the previous example, the message content is 1[58, 1.20, 0, 100, t/h][59, 1.00, 0, 60, l/h]. The message content may comprise information on multiple graphs. For example information for updating four graphs may be provided in one message content. The message may be send constantly on short intervals, for example once a second or every two seconds. Thus the receiving graphics controller or screen driver is able to currently update the displayed graph accordingly. The operator is able to follow up the graph(s), monitor efficiency of the work process, control operating parameters of the work machines and adjust the work process.

Graphical data related to the job id may be provided to a data system from work machines having the same job id. For example, the graphical data from a work machine or for the whole chain of work machines may be sent by a work machine to a remote network database. Information on status and inter-working situation of work machines may then be formed using the data collected to the remote database. The graphical data presented may be based on the job id. For example efficiency data related to the job id may be displayed to the user with a comparison to an information on an optimal inter-working situation. Based on this, the machine(s) may be controlled, thus improving efficiency of operating the work machines by the user.

Figure 8:
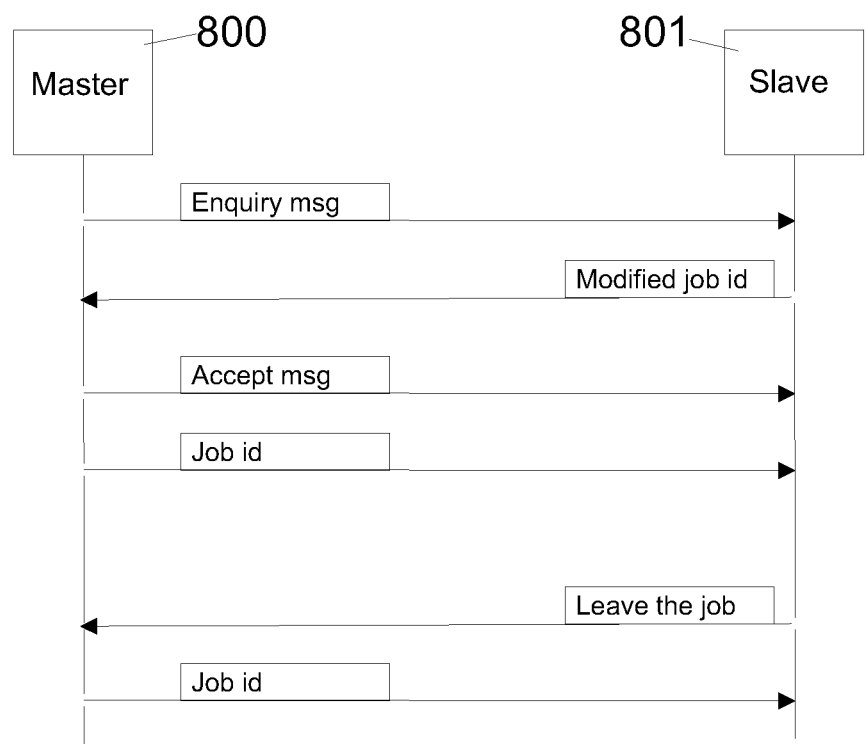
FIG. 8 shows a flow chart of messaging according to an embodiment.

FIG. 8 shows a flow chart of messaging according to an embodiment. One entity of the FIG. 8 is a communication master machine 800, and the other entity is a slave machine 801. The communication master machine creates a job id and sends it to a local network. The communication master machine 800 sends an enquiry message for other machines to join to the job with it. The message is in the air, readable by a receiver in the area of the network and able to read and receive such message(s). The message is received by the slave machine 801. The slave machine 801 wishing to join the job identified in the enquiry message of the communication master machine 800 takes the content part of the message, which comprises job id. The slave machine 801 modifies the job id such that it adds its machine specific information to the existing information of the job id. Then the slave machine 801 sends a message comprising the modified job id in the content field to the communication master machine 800. The communication master machine 800 receives the message containing the modified job id. It accepts the slave machine 801 to the job. The communication master device 800 takes the modified job id as a new common job id and sends an acceptance message to the slave machine 801. After this the communication master machine 800 transmits the updated job id. The communication master machine may send an enquiry message comprising the modified job id. Other machines may join similarly. All the machines of the job receive message with currently updated job id from the communication master machine 800. If a slave machine 801 wishes to leave or exit the job, it sends a leave the job message to the communication master machine 800. The slave machine 801 may just leave after sending the message without waiting for any acknowledgement and/or permission. The communication master 800 updates the job id. The information relating to the slave machine 801, which has informed to leave or exit the job, is removed from the job id. Relation between the remaining machines of the job is updated accordingly. The updated job id is transmitted by the communication master machine 800. The communication master machine may send an enquiry message, which now comprises the updated job id.

Figure 9:
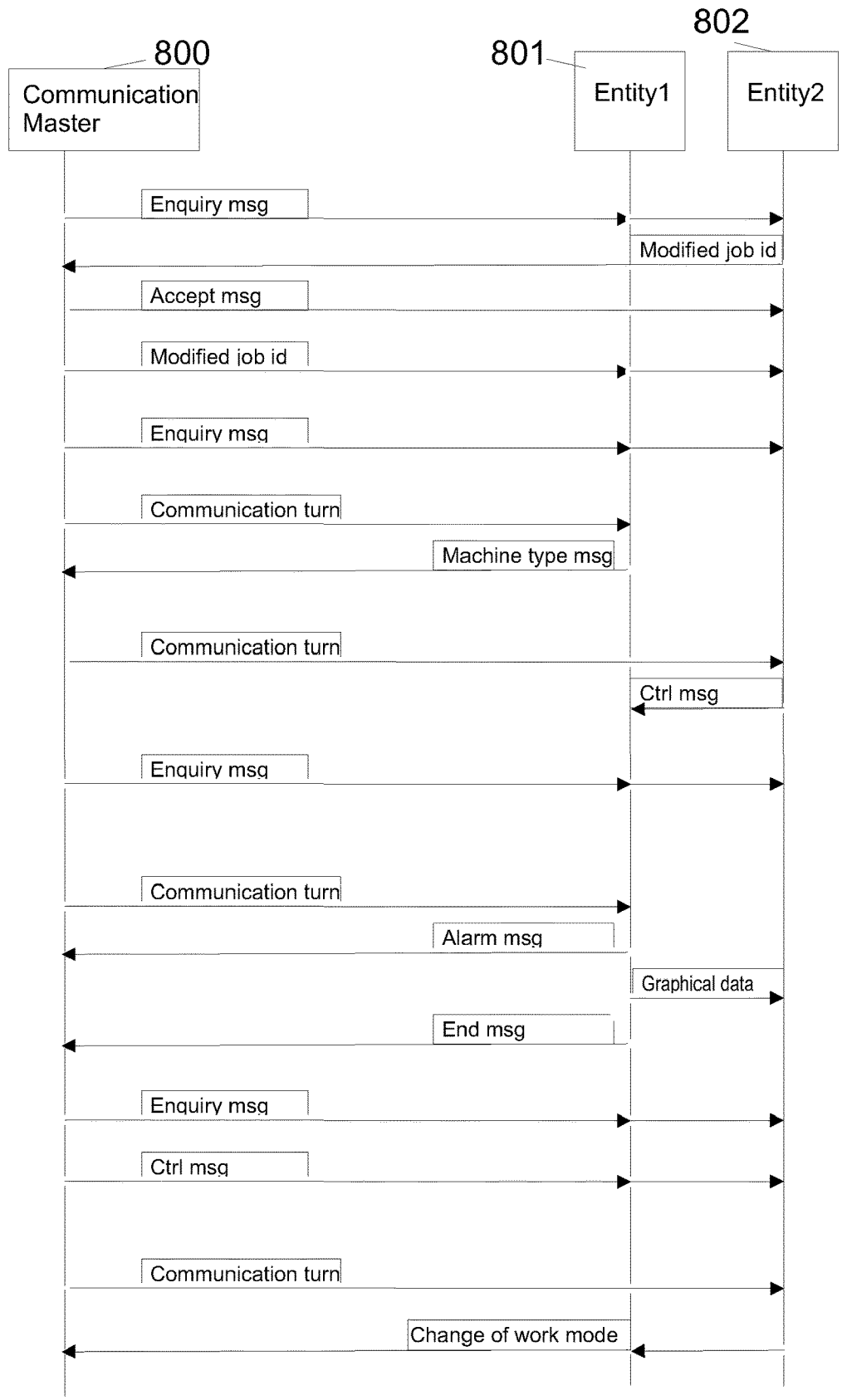
FIG. 9 shows a flow chart of messaging according to an embodiment.

FIG. 9 shows a flow chart of messaging according to an embodiment. A communication master has started a job and entity1 has joined to the job. This may correspond to the joining as presented with the FIG. 8. The communication master transmits an enquiry message. The enquiry message is readably and receivable by a machine in the messaging range or coverage area. entity2 receives the enquiry message sent by the communication master. Entity2 modifies the job id of the enquiry message. Entity2 adds information relating to it to the job id. Entity2 sends a message comprising the modified job id to the communication master. The communication master may check that the received message and/or the sending entity2 is acceptable. If the sending entity and/or the received message is acceptable, the communication master sends an accept message to the entity2. The entity2 has been accepted to the job, information on it has been updated to the job id and the communication master transmits the modified job id. The message comprising the modified job id is received by all machines of the job. Now the communication master, entity1 and entity2 all share the common modified job id. The communication master transmits an enquiry message, which now comprises the modified job id.

The communication master is arranged to give communication turns to the entities joined to the job. The communication master sends a communication turn message to the entity1, and thereby gives a turn to communicate to the entity1. The entity1 sends a machine type message. The machine type message may comprise information on machine type, manufacturer, model, type and/or main user. The machine type message works as a heat beat message, which when received by the communication master carries the information that the sender entity is operational and/or functional. This enables the communication master to have knowledge on status of the sending entity. The entities may send a machine type message constantly on certain communication turns, for example every fifth communication turn.

This may be send as a sole message of the communication turn, or in addition to other messages sent in one communication turn.

The communication master sends a communication turn message to the entity2. The entity2 is thereby given a turn to communicate. The other entities know not to communicate. The entity2 sends a control message to the Entity2. The control message may comprise a variable or a factor relating to a parameter of the sending entity. The receiving entity may adjust its operation based on the received control message. The control message sent by the entity 2 in the FIG. 9 may contain for example value 50. The entity 1 after receiving the control message knows that it should reduce to half speed in order to comply with the entity2. The entity1 may choose to reduce to half speed. In the next communication turn the entity1 may send a corresponding control message to the communication master. The entity1 receiving the control message may not change its operation. In any case of incompatibility of entities or the job, an operation master has control of the operation of the entities and may change the operation. The operation master may be for example entity2, if last logged in by the main user, as described in more details in previous.

The communication master transmits an enquiry message. The communication master sends a communication turn message to the entity1. The entity1 sends an alarm message to the communication master. The alarm message may contain alarming information relating to entity parameter, for example temperature information. The entity1 sends another message comprising information for graphical data. The graphical data message is sent to the operation master, which is in this example the entity2. An information may be displayed accordingly in a display of the operation master. The main user of the entity2, or the operation master entity, may get updated information on the entities of the job. The information may be presented as chosen, in accordance to the graphical data information sent by the entities joined to the job. After the two messages, the entity1 sends an message indicating end of messages. Thus it lets the communication master know that its communication turn is over and a turn may be given to next entity.

The communication master sends an enquiry message for possible new entities joining to the job. The communication master sends a control message. Control message sent by the communication master may comprise a light pattern information. The control message form the communication master is sent to all entities joined to the job. All the entities of the job receive the light pattern information. Lights of the entities are arranged to blink and/or be turned on/off in a manner as instructed in the light pattern information. After entities have received a control message from the communication master, they all implement similar light patterns via their lights. Thus the entities of the job have an external feature they share, and may be recognized via it. This may provide safety to the environment.

The communication master gives a communication turn by sending the corresponding message to the entity2. The entity2 sends a request for changing a work mode message. The request for changing a work mode message may comprise for example information from a wheel loader that it will change place, where it gets material. This may cause longer transportation time of the material, for example. In this case, the other entities receiving the request may slow down their operation speed correspondingly. The request for changing a work mode may comprise information on changing previously used material to another material. This may cause other entities to change their work mode, and/or operational parameters accordingly. Also, this may cause some existing entity becoming useless for changed conditions.

The control of a work process is implemented via a messaging system. The messaging system enables the machines of the common work process to communicate via messaging. The messaging enables fast and efficient information sharing. This may enhance the work process efficiency. The machines communicate constantly, so information is constantly shared. Possible adjustments of the work process or operational parameters may be implemented as a response to the corresponding message. This avoids following up results and deciding on possible adjustments based on work product or collected and displayed data.

The messages according to embodiments may comprise a checksum. This enables protecting the messages and avoiding processing false messages. The checksum is checked after a message is received. If it matches with the predetermined, the message is received and processed accordingly, If the checksum does not match, then the message is simply rejected.

The messaging system according to embodiments provides effectiveness to the work process and control of it. Messages are sent asynchronously. Work machines of the job are given a slot to transmit their messages. A single message is kept relatively short. Short messages pose less requirements for the network. The whole messaging system is kept simple. If there are small losses on a field of a sent message, it may not ruin the whole message. On the other hand, if a message is lost, the constant sending cycle of the machines enables the message to be send again on the next turn. Thus the message may be slightly delayed. In contrast sending acknowledgement message for each received message would cause more delays to the whole messaging system. Complex correction checks and/or corresponding resending of messages is avoided. This makes the system easy and error-free.

Each work machine of the job is given a turn to send a message. A single message is short, enabling limited amount of data to be sent. Messages have certain maximum size, for example 128 bytes. A send message may be shorter than the maximum size of the message. This enables effective use of the bandwidth. The network is not transmitting the same sized messages, but where useful, a shorter message requiring less bandwidth is transmitted. In order to enable more information to be sent, a machine has possibility to send multiple messages in its turn. The machine may communicate all available and/or relevant issues in its turn by sending several messages. After sending more than one messages, the machine sends a message indicating end of communication turn. The messaging system is flexible to transmit shorter messages and/or multiple sequential messages from the same origin. The messaging system enables fast communication between the machines of the work process. There are no constant times for the messaging turns, but the time is allocated and used according to current need.

Embodiments may enable controlling working machines. Machines of a work process may communicate via messages. A message may comprise a job identifier, which indicates working relationship among machines of the job. A message, or a job identifier, may be modified by a machine joining to the job. The machines joined in the same job share a common job identifier. A modifiable job identifier enables to share, among machines of the job, information of the work process and/or machines working in it and/or placement of the machines in relation to each other. A working process comprising different working machines and/or different placement of working machines and/or moving working machines may be controlled via a messaging system. The machines of the job are aware and know the current job identifier. Thus the machines of the job know their position in view of other machines and are for example able to send messages to each other in order to adjust the process and/or another machine based on their parameters and/or working status.

A messaging system according to embodiments may enable controlling work process entities with reduced user interaction. A communication master of the messaging system may share communication turns and overview the job process. The communication master may accept a new entity to the process. Entities of the messaging system may communicate straight to each other. This entity-entity-messaging may enable fast and effective information sharing, straight to the correct receiver. Message sizes and contents may vary. Acknowledgement messages are not send for each message by default. Adjusting message size and avoiding additional messages, like acknowledgement messages, enables effective communication system which is adjustable according to current situation.

Although the previous description mainly shows work machines, many different kind of entities are suitable to be controlled according to embodiments, for example using a messaging system. Thus other entities fall into the scope and spirit of the appended claims.

The above example embodiments of the invention are not to be understood as limiting the invention thereto. On the contrary, the invention can be varied within the scope of the appended claims.

The invention claimed is:

1. A method for managing waste processing work machines that includes a sending work machine and a receiving work machine, the receiving work machine including a processor connected to a communication module, the processor configured to execute non-transitory machine readable instructions, wherein the method comprises:
  execution of the non-transitory machine readable instructions by the processor to cause the receiving work machine to:
    receive, using the communication module, a first message from the sending work machine, said first message comprising message fields,
  detect at least one message field of the message fields of the first message, the detected at least one message field including information on other waste processing work machines already joined in a job and a job identifier (job-id);
  form at least one modified message field to update the job identifier to include information of the receiving work machine and a placement of the receiving work machine in relation to the other waste processing work machines already joined in the job,
  transmit using the communication module, the updated job identifier in a response message sent from said receiving work machine to said sending work machine, wherein each of the other waste processing work machines already joined in the job receives the response message transmitted from the receiving work machine;
  receive an acceptance message from the sending work machine responsive to the sending of the response message; and
  join the job in the placement relative to the other waste processing work machines already joined in the job;
  wherein the sending work machine and the receiving work machine, together with the other waste processing work machines already joined in the job, form a chain of interlinked work machines, and wherein at least one work machine in the chain of interlinked work machines is configured to inform one or more of an earlier work machine or a later work machine in the chain, of a work output of the at least one work machine, and one or more of the earlier work machine or the later work machine is configured to adjust its operation in dependence of the work output of the at least one work machine; and
  wherein execution of the non-transitory machine readable instructions by the at least one processor of the receiving work machine is further configured to cause the receiving work machine to:
  send a log out message field comprising information on said receiving work machine exiting said job,
  receive a modified job id, the from the sending work machine, the sending machine removing information relating to said receiving work machine exiting said job,
  transmit the modified job id, and
  exit the job,
    wherein said modified job-id comprises information on machines remaining joined in the job, and their placement in relation to each other.

2. A method according to claim 1, wherein
  said job-id being an identifier of said job,
  said job-id comprising said information on machines joined in the job, and
  said at least one modified message field comprising a modified job-id, said modified job-id comprising information of the receiving machine and its placement in relation to other machines earlier joined in the job.

3. A method according to claim 1, wherein
  said message comprises a first message field comprising an identifier of said sending working machine,
  said message comprises a second message field comprising an identifier of said receiving working machine, and
  said message comprises a third message field comprising the job-id, which said job-id further comprises information on working machines currently joined in the job.

4. A method according to claim 1, wherein said sending working machine is a communication master in said job and said communication master giving communication turns to other working machines in said job.

5. The method according to claim 1, wherein the updated job identifier includes one or more of information on user(s), a work site, a work type, work machines joined to the job and configurations of the work machines joined to the job and operational parameters for the work machines joined to the job.

6. The method according to claim 1, wherein the updated job identifier is used by one or more of the waste processing work machines joined to the job to set an operational parameter of the waste processing work machine.

7. The method according to claim 1 wherein the processor is configured to cause the receiving work machine to receive a control message sent from a previous work machine in a chain of waste processing work machines joined to the job, and wherein the receiving work machine adjusts its performance based on the received control message.

8. The method according to claim 7, wherein the control message instructs the receiving work machine to slow its operation and the receiving work machine slows its operation and sends another control message to a next work machine in the chain to slow its operation.

9. A method for managing work machines that includes a sending work machine and a receiving work machine, the sending work machine including a processor connected to a communication module, the processor configured to execute non-transitory machine readable instructions, wherein the method comprises:
  execution of the non-transitory machine readable instructions by the processor to cause the sending work machine to control the communication module to:
  transmit a message to a receiving work machine, said message comprising message fields, wherein at least one message field of the message fields comprises information on other work machines already joined in a job and a job identifier (job-id),
  receive a message comprising at least one modified message field including an updated job identifier from said receiving work machine, wherein execution of the non-transitory machine readable instructions by the processor causes the sending work machine to determine from said modified message field, information of the receiving work machine and a placement of the receiving work machine in relation to other work machines already joined in the job;

transmit an acceptance message to the receiving work machine to allow the receiving work machine to join the job in the placement relative to the other work machines already joined in the job;

transmit the updated job identifier to all other work machines joined in the job;

wherein the sending work machine and the receiving work machine, together with the other machines already joined in the job, form a chain of interlinked work machines, and wherein at least one work machine in the chain of interlinked work machines is configured to inform one or more of an earlier work machine or a later work machine in the chain, of a work output of the at least one work machine, and one or more of the earlier work machine or the later work machine is configured to adjust its operation in dependence of the work output of the at least one work machine and the updated job identifier; and wherein execution of the non-transitory machine readable instructions by the processor further causes the sending work machine to:

receive a message comprising a log out message field, said log out message field comprising information on said receiving work machine exiting said job, modify a job id by removing information on said receiving work machine exiting said job, and send the modified job id, wherein said modified job-id comprises information on working machines remaining joined in the job, and a placement of the working machines remaining joined in the job in relation to each other.

10. A method according to claim 9, wherein said job-id being an identifier of said job, said job-id comprising said information on machines joined in the job, and said at least one modified message field comprising a modified job-id, said modified job-id comprising information of the receiving machine and its placement in relation to other machines earlier joined in the job, and said method comprising receiving said modified job-id from said receiving work machine to said sending work machine.

11. A non-transitory computer program product comprising computer executable code, said computer executable code being arranged to, when executed on a processor, to cause a system to:

receive a first message at a first working machine, said first message comprising message fields, wherein at least one message field comprises information on working machines already joined in the job and a job identifier, form at least one modified message field to update the job identifier to include information of the receiving first working machine including an operational parameter and a placement of the first working machine in relation to the other working machines already joined in the job, transmit said at least one modified message field from said receiving first working machine to a second working machine that sent the first message, wherein each working machine in a chain of working machines joined in the job receives the at least one modified message field;

wherein the first working machine joins the job upon receipt of an acceptance message from the second working machine and at least one of the working machines in the chain of working machines joined in the job updates an operational parameter in response to the updated job identifier; and wherein execution of the computer executable code by the processor is further configured to cause the system to;

receive a log out message field at the second working machine, said log out message field comprising information on the first working machine exiting said job, the second working machine configured to modify a job-id by removing information on the first working machine exiting said job, transmit the modified job-id to the first working machine, the modified job-id comprising information on machines remaining joined in the job, and their placement in relation to each other; and wherein the first working machine is configured to exit the job.

12. A non-transitory computer program product comprising computer executable code, said computer executable code being arranged to, when executed on a processor, to cause a system to:

transmit a message to a receiving entity from a sending entity, said message comprising message fields, wherein at least one message field comprises information on entities already joined in the job and a job identifier (job-id), receive a message comprising at least one modified message field including an updated job identifier from said receiving entity to said sending entity, said modified message field including information of the receiving entity and its placement in relation to other entities already joined in the job;

transmit an acceptance message to the receiving entity to allow the receiving entity to join the job with the other entities already joined in the job;

transmit the updated job identifier to the other entities already joined in the job;

wherein at least one of the other entities already joined in the job adjusts an operational parameter based on the updated job identifier; and wherein execution of the computer executable code by the processor is further configured to cause the system to;

receive a message comprising a log out message field, said log out message field comprising information on said receiving work machine exiting said job, modify a job id by removing information on said receiving work machine exiting said job, and send the modified job id, wherein said modified job-id comprises information on working machines remaining joined in the job, and a placement of the working machines remaining joined in the job in relation to each other.

13. A messaging system for controlling a waste processing work machines that include a sending work machine and a receiving work machine, the receiving work machine including a processor connected to a communication module, the processor configured to execute non-transitory machine readable instructions, wherein the execution of the non-transitory machine readable instructions by the processor is configured to cause the messaging system, to form messages comprising message fields, of which at least one message field comprises a job-id, which comprises information on a current work process, and placement of entities currently joined in the current work process in relation to each other, and a new entity currently joined in the work process, wherein the messaging system comprises:

the sending work machine configured to send a first message including the message fields to the receiving work machine;

the receiving work machine configured to detect at least one message field of the message fields of the first message, the detected at least one message field including information on other waste processing work machines already joined in a job and a job identifier (job-id);

the receiving work machine configured to form at least one modified message field to update the job identifier to include information of the receiving work machine and a placement of the receiving work machine in relation to the other waste processing work machines already joined in the job, the receiving work machine configured to transmit using the communication module the updated job identifier in a response message sent from the receiving work machine to the sending work machine, wherein other waste processing work machines already joined in the job receive the response message transmitted from the receiving work machine;

the receiving work machine is configured to receive an acceptance message from the sending work machine responsive to the sending of the response message, and wherein the receiving work machine is configured to join the job in the placement relative to the other waste processing work machines already joined in the job;

wherein the sending work machine and the receiving work machine, together with the other waste processing work machines already joined in the job, form a chain of interlinked work machines, and wherein at least one work machine in the chain of interlinked work machines is configured to inform one or more of an earlier work machine or a later work machine in the chain, of a work output of the at least one work machine, and one or more of the earlier work machine or the later work machine is configured to adjust its operation in dependence of the work output of the at least one work machine; and wherein the receiving work machine is configured to send a log out message field comprising information on the receiving work machine exiting the job; and the sending work machine is configured to modify a job-id by removing information relating the receiving work machine exiting the job;

the sending work machine is configured to transmit the modified job id; and the receiving work machine is configured to exit the job, wherein the modified job-id comprises information on machines remaining joined in the job, and their placement in relation to each other.

14. A messaging system according to claim 13, comprising an entity participating in the current work process, wherein the entity is arranged to be a communication master arranged to give communication turns to one or more other entities participating in the current work process.

15. A messaging system according to claim 14, comprising an enquiry message sent by the communication master, the enquiry message comprising the job-id.

16. A messaging system according to claim 13, comprising a joining message sent by a new entity joining to the job, which joining message comprises a modified job-id comprising information on the new entity.

* * * * *